US006526022B1

(12) United States Patent
Chiu et al.

(10) Patent No.: US 6,526,022 B1
(45) Date of Patent: Feb. 25, 2003

(54) DETECTING CONGESTION BY COMPARING SUCCESSIVE LOSS OF PACKETS IN WINDOWS TO PROVIDE CONGESTION CONTROL IN RELIABLE MULTICAST PROTOCOL

(75) Inventors: Dah Ming Chiu, Acton, MA (US); Miriam C. Kadansky, Westford, MA (US); Stephen R. Hanna, Bedford, MA (US); Stephen A. Hurst, Nashua, NH (US); Joseph S. Wesley, Quincy, MA (US); Philip M. Rosenzweig, Acton, MA (US); Radia J. Perlman, Acton, MA (US)

(73) Assignee: Sun Microsystems, Burlington, MA (US)

( * ) Notice: Subject to any disclaimer, the term of this patent is extended or adjusted under 35 U.S.C. 154(b) by 0 days.

(21) Appl. No.: 09/336,670

(22) Filed: Jun. 18, 1999

Related U.S. Application Data

(60) Provisional application No. 60/091,330, filed on Jun. 30, 1998.

(51) Int. Cl.[7] ............................................... G01R 31/08
(52) U.S. Cl. ........................................ 370/229; 370/252
(58) Field of Search .............................. 370/229, 230, 370/231, 232, 234, 235, 237, 242, 252, 253

(56) References Cited

U.S. PATENT DOCUMENTS 6,405,256 B1 * 6/2002 Lin et al. .................... 709/231

* cited by examiner

Primary Examiner—Wellington Chin
Assistant Examiner—Brenda Pham
(74) Attorney, Agent, or Firm—Cesari and McKenna, LLP

(57) ABSTRACT

A method of detecting congestion in a computer network uses a receiving station which determines a first number of messages missing in a first acknowledgment window. The station then determines a second number of messages missing in a subsequent acknowledgement window. The station then measures congestion on the network in response to an increase in the number of missing messages as indicated by the first number of missing messages in the first acknowledgement window and the second number of missing messages in the second acknowledgement window.

3 Claims, 30 Drawing Sheets

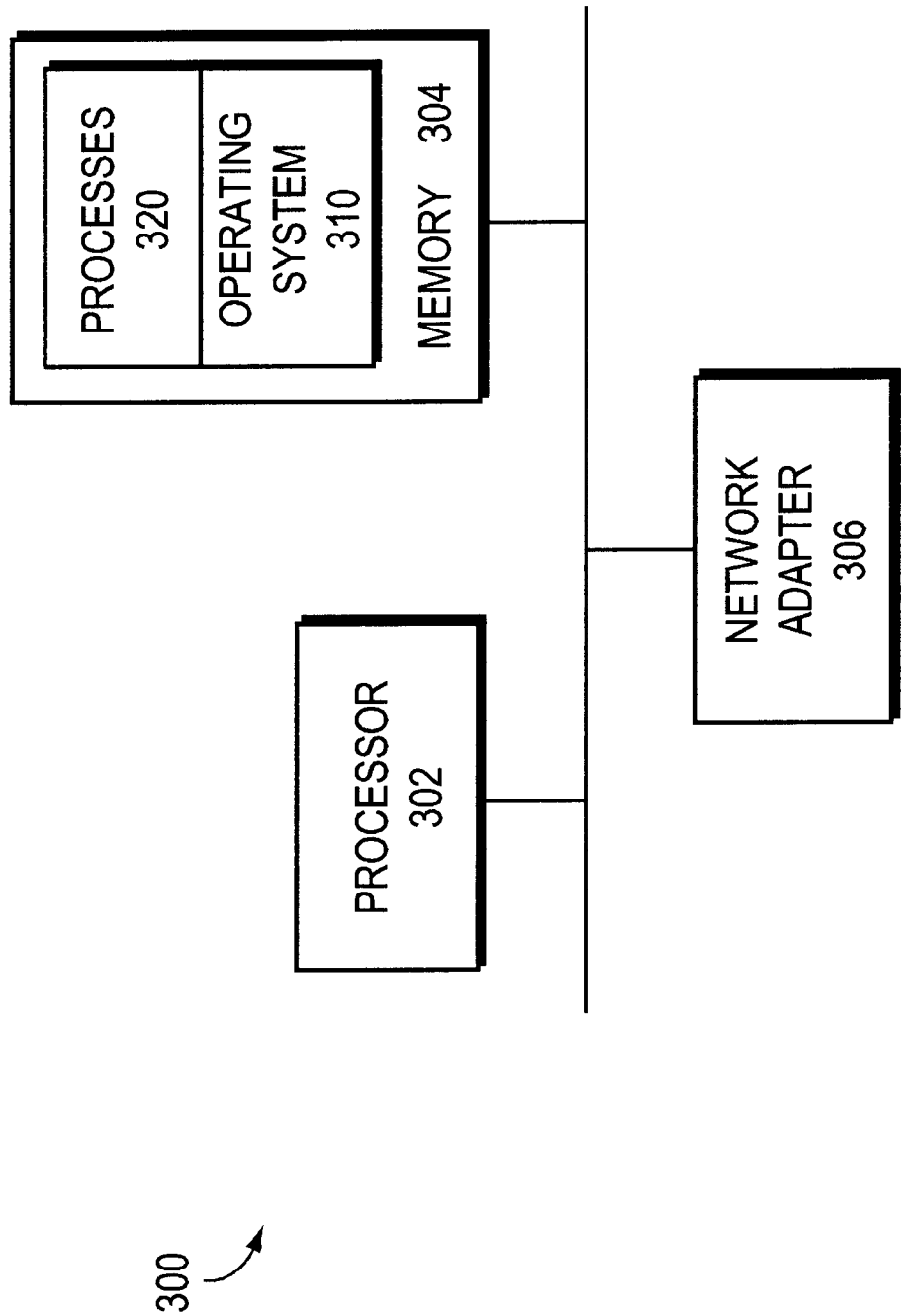

MESSAGE TYPES

| NUMBER | MESSAGE TYPE | SUB-MESSAGE TYPE | DESCRIPTION |
|---|---|---|---|
| 1 | MCAST_MANAGEMENT | | TRAM MULTICAST CATEGORY MESSAGE |
| 1a | | BEACON | TRAM MESSAGE |
| 1b | | RESERVED | |
| 1c | | HELLO | HELLO MESSAGE |
| 1d | | HA | HEAD ADVERTISEMENT |
| 1e | | MS | MEMBER SOLICITATION |
| 2 | MCAST_DATA | | TRAM MULTICAST DATA MESSAGE |
| 2a | | DATA | TRAM DATA MESSAGE |
| 2b | | DATA_RETXM | TRAM DATA MESSAGE RETRANSMISSION |
| 3 | UCAST_MANAGEMENT | | TRAM UNICAST MANAGEMENT MESSAGE |
| 3a | | RESERVED | |
| 3b | | AM | ACCEPT MEMBERSHIP MESSAGE |
| 3c | | RM | REJECT MEMBERSHIP MESSAGE |
| 3d | | HELLO_Uni | HELLO MESSAGE WITH ACK REQUEST |
| 3e | | ACK | ACK MESSAGE |
| 3f | | CONGESTION | RATE BASED CONGESTION MESSAGE |
| 3g | | RESERVED | |
| 3h | | RESERVED | |
| 3i | | HB | TRAM HEAD BIND MESSAGE |

FIG. 11

TIMERS USED IN TRAM

| NUMBER | TIMER PARAMETER | DEFAULT VALUE | DESCRIPTION |
|---|---|---|---|
| 1 | T_BEACON | 1000 ms | INTER BEACON INTERVAL |
| 2 | T_BEACON_FILLER | 30 sec | INTER BEACON FILLER INTERVAL |
| 3 | T_ACK_INTERVAL | RUN TIME COMPUTATION | COMPUTED BASED ON THE CURRENT RATE OF DATA TRANSMISSION BY THE DATA SOURCE AND THE SIZE OF THE CONFIGURED ACKNOWLEDGEMENT WINDOW |
| 4 | T_HELLO | 1 PER ACK INTERVAL | INTER HELLO INTERVAL |
| 5 | T_MS | 500 ms | INTER MS INTERVAL |

FIG. 12

COUNTERS USED IN TRAM

| NUMBER | COUNTER PARAMETER | DEFAULT VALUE | DESCRIPTION |
|---|---|---|---|
| 1 | N_ACK_MISSES | 4 | THE NUMBER OF ACK MESSAGES THAT CAN BE MISSED BEFORE DECLARING THE MEMBERS AS NON RESPONSIVE |
| 2 | N_HELLO_MISSES | 5 | THE NUMBER OF HELLO MESSAGES THAT A MEMBER HAS MISSED TO DECLARE THE HEAD AS NON-RESPONSIVE |
| 3 | N_HB_RETXM | 3 | IN MTHA, THE NUMBER OF TIMES A HB CAN BE SENT BEFORE TRYING ANOTHER HEAD |
| 4 | N_MS_RETXM | 3 | THE NUMBER OF TIMES A MS NEEDS TO BE SENT BEFORE INCREASING ITS TTL |

FIG. 13

SENDER BEACON MESSAGE

| 0 | | | 31 |
|---|---|---|---|
| VER # | M TYPE | SUB-TYPE | FLAGS |
| LENGTH OF THE MESSAGE IN BYTES | | RESERVED | RESERVED |
| SOURCE ADDRESS | | | |
| SEQUENCE NUMBER | | | |
| HEAD ADVERTISEMENT INTERVAL | | RESERVED | RESERVED |

FIG. 14

DATA MESSAGE

| 0 | | | 31 |
|---|---|---|---|
| VER # | M TYPE | SUB-TYPE | FLAGS |
| LENGTH OF MESSAGE IN BYTES | | CHECKSUM | |
| MESSAGE SEQUENCE NUMBER | | | |
| HEAD ADVERTISEMENT INTERVAL | | RESERVED | RESERVED |
| APPLICATION DATA | | | |

FIG. 15

HA MESSAGE

| 0 | | | | 31 |
|---|---|---|---|---|
| VER # | M TYPE | SUB-TYPE | FLAGS | |
| LENGTH OF MESSAGE IN BYTES | | TTL DISTANCE | HState | MRole |
| DATA SOURCE ADDRESS | | | | |
| RxLevel | LAN IDENTIFICATION | UNICAST PORT IN USE | | |
| DIRECT MEMBER COUNT | | IN-DIRECT MEMBER COUNT | | |
| TIME STAMP | | | | |

FIG. 16

MEMBER SOLICITATION
MS MESSAGE

| 0 | | | 31 |
|---|---|---|---|
| VER. # | M TYPE | SUB-TYPE | FLAGS |
| LENGTH OF THE MESSAGE IN BYTES | | TTL | Mrole | RESERVED |
| DATA SOURCE ADDRESS | | | |
| RxLevel | RESERVED | UNICAST PORT IN USE | |
| TIME STAMP | | | |
| DIRECT MEMBER COUNT | | INDIRECT MEMBER COUNT | |

FIG. 17

HELLO MESSAGE

| 0 | | | 31 |
|---|---|---|---|
| VER # | M TYPE | SUB-TYPE | FLAGS |
| LENGTH OF MESSAGE IN BYTES | | TTL SCOPE | Hstate \| CState |
| CHECKSUM | | NUMBER OF ACK MEMBERS | RESERVED |
| DATA SOURCE ADDRESS | | | |
| UNICAST PORT IN USE | | TOTAL MEMBER COUNT | RESERVED |
| TIME STAMP | | | |
| PACKET SEQUENCE NUMBER | | | |
| MEMBER ADDRESS THAT NEEDS TO ACK | | | |
| MEMBER ADDRESS THAT NEEDS TO ACK | | | |
| • | | | |
| • | | | |
| • | | | |
| MEMBER ADDRESS THAT NEEDS TO ACK | | | |

FIG. 18

ACK MESSAGE

| 0 | | | 31 |
|---|---|---|---|
| VER # | M TYPE | SUB-TYPE | FLAGS |
| MESSAGE LENGTH | | BITMASK LENGTH | |
| CHECKSUM | | MRole | CState | RESERVED |
| MULTICAST ADDRESS | | | |
| DATA SOURCE ADDRESS | | | |
| START WINDOW SEQUENCE NUMBER | | | |
| TIME STAMP FROM HELLO MESSAGE | | | |
| DIRECT MEMBER COUNT | | INDIRECT MEMBER COUNT | |
| DIRECT ADVERTISING HEAD COUNT | | INDIRECT ADVERTISING HEAD COUNT | |
| RECEIVE BIT MASK | | | |
| • | | | |
| • | | | |
| • | | | |
| RECEIVE BIT MASK | | | |

FIG. 19

HELLO UNI MESSAGE

| 0 | | | 31 |
|---|---|---|---|
| VER. # | M TYPE | SUB-TYPE | FLAGS |
| MESSAGE LENGTH | | RxLevel | Hstate | Cstate |
| MULTICAST ADDRESS | | | |
| DATA SOURCE ADDRESS | | | |
| DISTANCE FROM DATA SOURCE | | | |

FIG. 20

HEAD BIND MESSAGE

| 0 | | | 31 |
|---|---|---|---|
| VER. # | M TYPE | SUB-TYPE | FLAGS |
| MESSAGE LENGTH | | TTL DISTANCE | Mrole | RESERVED |
| DATA SOURCE ADDRESS | | | |
| DIRECT MEMBER COUNT | | INDIRECT MEMBER COUNT | |

FIG. 21

ACCEPT MEMBERSHIP MESSAGE

| 0 | | | 31 |
|---|---|---|---|
| VER. # | M TYPE | SUB-TYPE | FLAGS |
| MESSAGE LENGTH | | RESERVED | RESERVED |
| MULTICAST ADDRESS | | | |
| DATA SOURCE ADDRESS | | | |

FIG. 22

REJECT MEMBERSHIP MESSAGE

| 0 | | | 31 |
|---|---|---|---|
| VER. # | M TYPE | SUB-TYPE | FLAGS |
| MESSAGE LENGTH | | REASON CODE | RESERVED |
| MULTICAST ADDRESS | | | |
| DATA SOURCE ADDRESS | | | |

FIG. 23

DETECTING CONGESTION BY COMPARING SUCCESSIVE LOSS OF PACKETS IN WINDOWS TO PROVIDE CONGESTION CONTROL IN RELIABLE MULTICAST PROTOCOL

RELATED APPLICATIONS

This application claims the benefit of Provisional Application No. 60/091,330, filed Jun. 30, 1998.

This Application is related to the following patent applications:

Title, "Dynamic Optimization Using the Number of Member Receiver Stations in a Repair Group for Receiver Stations Having Dense of Sparse Topological Arrangements in Tree Based Repair in Reliable Multicast Protocol" by, Miriam C. Kadansky, Dah Ming Chiu, Stephen R. Hanna, Stephen A. Hurst, Joseph S. Wesley, Philip M. Rosenzweig, and Radia J. Perlman, filed on Jun. 18, 1999 with Ser. No. 09/336,669, Title, "Dynamic Optimization for Receivers Using Distance Between a Repair Head and a Member Station in a Repair Group for Receivers Having a Closely Knit Topological Arrangements in Tree Based Repair in Reliable Multicast Protocol" by, Miriam C. Kadansky, Dah Ming Chiu, Stephen R. Hanna, Stephen A. Hurst, Joseph S. Wesley, Philip M. Rosenzweig, and Radia J. Perlman, filed on Jun. 18, 1999 with Ser. No. 09/336,669, Title, "Multiple ACK Windows Providing Congestion Control in Reliable Multicast Protocol" by, Dah Ming Chiu, Miriam C. Kadansky, Stephen R. Hanna, Stephen A. Hurst, Joseph S. Wesley, Philip M. Rosenzweig, and Radia J. Perlman, filed on Jun. 18, 1999 with Ser. No. 09/336,659;

Title, "Historically Highest Transmission Rate for Determining Incremental Transmission Rate to Provide Congestion Control in Reliable Multicast Protocol" by, Dah Ming Chiu, Miriam C. Kadansky, Stephen R. Hanna, Stephen A. Hurst, Joseph S. Wesley, Philip M. Rosenzweig, and Radia J. Perlman, filed on Jun. 18, 1999 with Ser. No. 09/336,671;

all disclosures of which are incorporated herein by reference.

FIELD OF THE INVENTION

This invention relates to multicast communication in computer networks, and more particularly to flow control in reliable multicast communication.

BACKGROUND

Communication between computers in a computer network can be established by one of several methods. These include unicast messaging (where a source station and a destination station exchange messages over a point to point path), broadcast communication (where a sender station transmits messages which may be received by all stations attached to the network), multicast communication (where a sender station transmits messages which may be received by a predetermined group of stations), and so forth.

Detecting congestion in a computer network is difficult as the congestion often happens at intermediate nodes deep within the network, and the effect of congestion occurs at end stations which do not receive packets. The end station knows that it missed some packets because the packets carry sequence numbers, and the end station finds that it has missed some sequence numbers, and therefore missed the packets. Once an end station has detected congestion it can send a message to the transmitting station so that the transmitting station can reduce the rate at which it is transmitting data onto the network.

Early detection of congestion, before an end station has lost too many packets, is desirable. Waiting for an end station to detect that it has missed many packets before transmitting a congestion message back to the transmitting station may permit congestion to grow to undesirably high levels.

It is desirable to detect congestion early so that a transmitting station can take action to reduce its rate of transmission before congestion grows to high levels of packet loss.

SUMMARY OF THE INVENTION

A method of detecting congestion in a computer network uses a receiving station which determines a first number of messages missing in a first acknowledgment window. The station then determines a second number of messages missing in a subsequent acknowledgement window. The station then measures congestion on the network in response to an increase between the first number of missing messages in the first acknowledgement window and the second number of missing messages in the second acknowledgement window.

BRIEF DESCRIPTION OF THE DRAWINGS

Referring now to the drawings, in which like numerals represent like parts in the several views:

FIG. 3 is a schematic block diagram of a station, such as an end station, configured to operate in accordance with a reliable multicast transport protocol of the present invention;

FIG. 11 is a chart showing various messages and submessages used in TRAM.

FIG. 12 is a table showing the timers used by TRAM.

FIG. 13 is a table showing counters used by TRAM.

FIG. 14 is a block diagram showing a multicast packet format for a sender Beacon Message.

FIG. 15 is a block diagram showing a packet format for a Data Message.

FIG. 16 is a block diagram showing a packet format for a HA Message.

FIG. 17 is a block diagram showing a packet format for a MS Message.

FIG. 18 is a block diagram showing a packet format for a Hello Message.

FIG. 19 is a block diagram of a packet format for a ACK Message.

FIG. 20 is a block diagram of a unicast packet format for a Hello Uni Message.

FIG. 21 is a block diagram of a packet format for a Head Bind Message.

FIG. 22 is a block diagram of a packet format for a Accept Membership Message.

FIG. 23 is a block diagram of a packet format for a Reject Membership Message.

DETAILED DESCRIPTION

Reliable Communication

Figure 1:
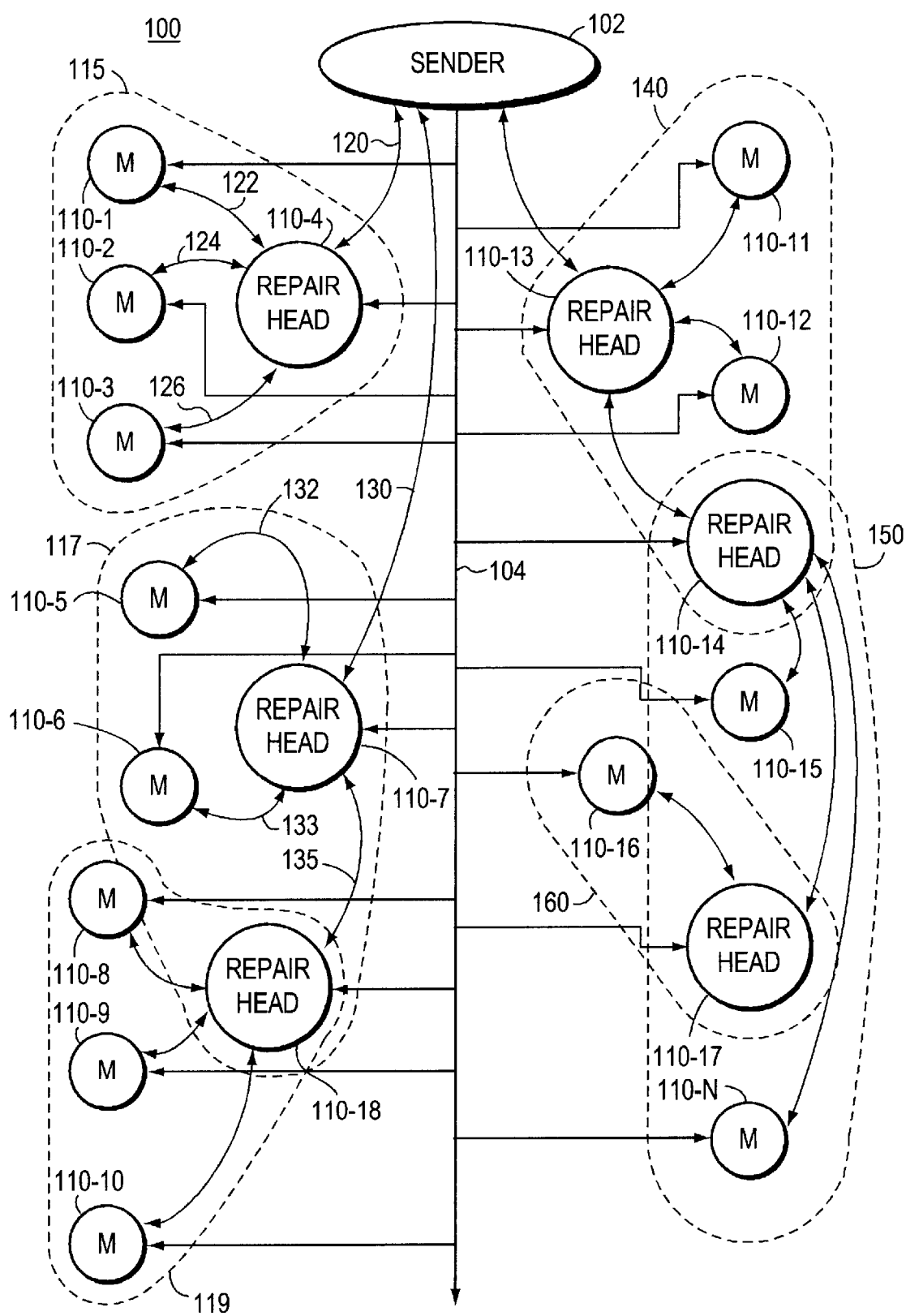
FIG. 1 is a block diagram of a multicast repair tree in accordance with the invention.

The reliability of communication, for example a file transfer comprising a plurality of messages, is an important element in computer networking. Reliable unicast communication is established by implementations based upon the concept of a protocol stack. A protocol stack has several levels. At the lowest, or "physical", layer, a physical connection is established between two computers.

The physical connection permits hardware in the "physical" layer to exchange signals between two computers. At the next higher layer, the "data link" layer, frames are constructed in accordance with the requirements of the communication protocol used on the physical layer. The data link layer provides a best effort, but unreliable, transfer of packets between a sending computer and a receiving computer. Each packet is numbered by a "sequence number" for use by that layer of the protocol for establishing reliable communication.

The next higher layer, for example in some protocols the "LLC2" layer, in other protocols the "network layer", and in still other protocols the "transport" layer, permits establishment of reliable communication. In the transmitter a cache of already transmitted packets is maintained, including the sequence number of each. The receiver checks the sequence number of the received packets and determines if any packets are missing. Packets may be missing because of congestion on the network, unreliability of the medium, static on the line, or any one of many possible reasons. In one design, the receiver transmits an acknowledgment (ACK) message to the transmitter indicating that a packet has been received, and also transmits a negative-acknowledge (NACK) message when it determines that a packet with a particular sequence number is missing. Upon receipt of an ACK, the transmitter flushes the packet from its cache (retransmit cache) used for retransmission of lost packets. Upon receipt of a NACK, the transmitter queues the packet from its retransmit cache and retransmits the packet.

The transmitter continues to wait for receipt of an ACK before flushing the packet from its retransmit cache. Some protocols use a time-out period with a timer rather than using ACK and NACK messages to signal that a packet should be retransmitted. Some protocols establish reliable communication on every hop of a communication pathway, and some do not.

Protocols used for reliable unicast message transfer are more fully described by Douglas E. Comer in the book Internetworking with TCP/IP, Volume I, and also Volume II, published by Prentice Hall, Englewood Cliffs, N.J., in 1991, all disclosures of which are incorporated herein by reference. The IP portion (Internet Protocol) of the TCP/IP protocol is a layer 3 protocol, and is used to establish unreliable transfer of messages between end stations, for example across the Internet. Layer 3 handles addressing, routing, etc. The TCP portion of TCP/IP (The Connection Protocol) is a layer 4 protocol and establishes reliable communication between the end stations by causing retransmission of packets using the IP protocol.

In a commonly used terminology, the words "datagram" and "message" are often used interchangeably. In an alternative usage, a "message" may be broken into one or more "datagrams". However, in this document the words "datagram" and "message" and "packet" are used interchangeably. A "frame" is used as the messaging unit transferred by the physical layer on a hop between two computers.

Unreliable multicast communication is relatively simple to implement, as the source station simply transmits the datagrams with an address that the designated computers can recognize as a multicast address, and which routers forward. The destination stations then receive any datagrams which they detect. No attempt is made to either identify or retransmit lost datagrams.

Reliable multicast is more difficult to implement. For example, in the case of a few destination computers, the source station must maintain a record of the ACK messages received from each intended destination station so that a datagram missing from any one of the destination stations can be retransmitted. However in the case where there are tens of thousands, even millions, of intended destination stations, the large number of ACK messages will flood the source station and will flood the network. The detrimental effect of too many ACK and too many NACK messages is referred to as ACK implosion or NACK implosion. Administration problems also arise, where for example, a source station has a particular destination station on its list of intended destination stations, and for some reason that destination station is no longer operational. The source station may then continue indefinetly retransmitting messages while waiting for an ACK from the missing station.

One solution to the reliable multicast problem, where the multicast message is to be received by a group of destination computers, has been to have an administrator (a person or a computer program operated by the person) set up a repair tree. In a repair tree, certain computers are designated as a "repair head". The rest of the computers of the group of destination computers are assigned to a designated repair head. Typically, a source station transmits a multicast datagram onto the network. The datagram should be received by all members of the destination group. Since the datagrams carry a sequence number, each destination station determine if it has missed a datagram. Each station sends an ACK to its repair head upon successful reception of a window of datagrams, and sends a NACK to its repair head upon determining that it has missed a datagram. Upon receipt of an ACK from every member of its repair group, the repair head flushes the datagram from its cache. The repair head retransmits any datagram for which it receives a NACK, until all members of its repair group respond with an ACK for each datagram.

In the event that a repair head is missing a datagram, it NACKs to the source station, and the source station retransmits the datagram. The source station maintains a cache of transmitted datagrams and flushes them after receipt of an ACK from each of the repair heads affiliated with the original source station.

Congestion on the network can result from large numbers of ACK and NACK messages. Particularly, a destination station which is slower than the transmitting source station will miss many multicast datagrams. The resulting NACK messages can cause a NACK implosion and contribute to network congestion. Upon receipt of a NACK message, a source station or repair head will begin retransmission of datagrams, thereby contributing to even more congestion. Congestion can particularly increase when a low bandwidth link is responsible for a number of destination stations being slower than the source station. Each destination station will miss numerous datagrams, and will flood the network with NACK messages, followed by more retransmissions in a feedback cycle which increases congestion.

FIRST EXEMPLARY EMBODIMENT

Turning now to FIG. 1, there is shown a multicast repair tree 100. Sender station 102 is transmitting a multicast message to the other stations shown in FIG. 1. Communication path 104 represents the fact that sender station 102 transmits a message having a multicast address, and this message is received by all of the addressed stations, 110-1, 110-2, . . . 110-N directly from sender station 102. Communication path 104 may include, physically, many hops through many physical networks. Communication path 104 simply represents that the destination stations receive the multicast message directly from sender station 102.

Multicast repair tree 100 may be established as a static structure, by for example a person establishing the sender, head, and member status on each station. The person normally has "network manager" status, and uses a computer program to establish the tree 100 by configuring the various stations through setting status in each member station by use of management control messages.

Alternatively, multicast repair tree 100 may be dynamically configured, as described more fully in the related application by M. C. Kadansky, et al. entitled "Dynamically Configured Tree Based Repair in Reliable Multicast Protocol", incorporated hereinabove by reference.

During operation of the dynamically configured multicast tree protocol, sender station 102 transmits beacon messages in order to assist in establishing the repair tree 100. Beacon messages transmitted by sender station 102 are also used in management of congestion control, in accordance with the invention.

Destination station 110-4 is selected to be a repair head by the tree forming process, either static or dynamic. Destination stations 110-1, 110-2, 110-3, and 110-4 form a repair group 115. Repair head 110-4 caches messages received from sender station 102, and repair head 110-4 transmits ACK messages to sender station 102 along path 120 as numbered messages are successfully received by repair head 110-4. Sender station 102 maintains a cache of messages which it has transmitted, and maintains a log of ACK messages received from various repair head stations so that it can clear a message from its cache after ACK messages have been received from all repair head stations, as will be more fully described hereinbelow.

Path 104 represents the multicast path where data, retransmission, and beacon messages flow. Paths 120, 122, 124 and 126, etc. represent unicast flows of ACK and congestion messages.

Repair head 110-4 receives ACK messages from the destination stations in its repair group 115, including destination station 110-1 along path 122, destination station 110-2 along path 124, and destination station 110-3 along path 126. Repair head 110-4 maintains a cache of messages transmitted by sender station 102, and upon receipt of ACK messages from all of the member stations of its repair group, deletes the message from its cache.

Repair group 115 is illustrated in FIG. 1 as having four (4) members, receiver members 110-1, and 110-2, and 110-3, designated by an "M", and also repair head 110-4. A repair head may have many members in its repair group.

In this way, repair head 110-9 acts to receive the ACK messages from members of its repair group 115, and "repairs" missing messages transmitted by sender station 102 to destination stations 110-1, and 110-2, and 110-3 of its repair group 115. By "repairing", that is by retransmitting missing messages, repair head 110-4 provides reliable multicast communication from sender station 102 to members of repair group 115.

Repair group 117 has as members stations 110-5, and 110-6, and 110-7, and 110-18, with member station 110-7 being the repair head. Repair head 110-7 caches messages received from sender station 102 and transmits its ACK messages to sender station 102 along path 130. Sender station 102 then retransmits a message for which it receives a NACK message from repair head 110-7. Ordinary members of repair group 117 transmit their ACK messages to repair head 110-7: station 110-5 along path 132, station 110-6 along path 133, and station 110-18 along path 135. Repair head 110-7 maintains a cache of all messages transmitted by sender 102, and deletes the messages as soon as an ACK is received from each of the member stations of repair group 117.

Repair group 119 illustrates a second level in the repair tree hierarchy. Station 110-18 is a member of repair group 117. Station 110-18 is also a repair head for repair group 119. Repair group 119 has members 110-18, its repair head, and also station 110-8, station 110-9, and station 110-10. Repair head station 110-18 maintains a cache of messages transmitted by sender station 102. Any messages missed by repair head station 10-18 are repaired by use of path 135 for sending ACKs (NACKs) to its repair head 110-7. Repair head station 110-18 receives ACK messages from member stations: station 110-8, station 110-4, and station 110-10, and when an ACK has been received from all member stations of its repair group, repair head station 10-18 deletes the message from its cache.

Similarly, repair group 140 has repair head 110-13 with additional member stations 110-11, station 110-12, and station 110-14. Repair head station 110-13 transmits its ACK messages to sender station 102, and so is in the first level of the hierarchical multicast repair tree.

Station 110-14 is also a repair head station for repair group 150, and so is a second-level repair head station.

Member station 110-17 of repair group 150 is also a repair head station for repair group 160, and so is a third-level repair head station in the repair tree hierarchy.

With a repair head hierarchy, the ACK messages are distributed among a plurality of repair head stations. The number of members of each repair group are limited so that each repair head station can handle the ACK messages, and can also handle the retransmission of messages for which NACK information is received. No "ACK implosion" and no "NACK implosion" occur, both because the repair work is distributed over many computer stations, and congestion and flow control prevent excessive packet loss, and so reliable multicast communication is established.

Congestion and Flow Control

The invention avoids an ACK implosion by spreading out the ACK (and NACK) messages so that a flood of them do not reach the repair head simultaneously. The use by members of the ACK window for timing of transmission of the ACK messages helps to prevent too many ACK messages from reaching the transmitting station at the same time. The ACK messages contain both acknowledgment information for packets received by the member station, and contain NACK information for packets not received by the member station, as based on the sequence numbers of the packets. The term "ACK message" will be used throughout this patent to indicate a message returned by a receiving station to a transmitting station, where the message carries both ACK and NACK information.

The ACK window is defined for a multicast session by establishing the number packets which make a full sequence of ACK windows. Receipt of a full window of packets is an event which triggers transmission of an ACK message by a member station. In a preferred embodiment of the invention, the ACK window size is configurable, and the default number of packets which make a full sequence of ACK windows is thirty two (32) packets.

To prevent many member stations from sending ACK messages at the same time, ACK messages are distributed over the next ACK window. Each member is assigned a window (for example between 1 and 32) for sending its ACK messages. For example, one member may send ACKs after receiving messages 32, 64, 96; etc., while another sends ACKs at messages 10, 42, 74, etc. The ACK messages may be sent as the next window of packets are being received, because at the levels of the protocol stack at which the invention operates, communication is full duplex.

In an exemplary embodiment of the invention, acknowledgments are also sent if an ACK timer counts up to, for example, greater than 1.5 times an estimated ACK interval. The estimated ACK interval is computed at each receiver when an ACK is sent. The estimated ACK interval estimates the amount of time it takes to receive an ACK window's worth of messages. The formula is:

ACK interval=ACK window*(Time since last ACK/Packets since last ACK)

If this timer expires, it indicates that the sender has paused and allows members to report and recover any lost packets without having to wait for the sender to start sending new data.

The ACK message format which both reports NACK information (that is, packet loss information) and acknowledgment information (ACK information) uses a bit map length field. Each ACK message contains the bit map length field and a start sequence number. If no packets were missing, the bit map length is "0" and the sequence number indicates that all packets prior to and including this packet were successfully received. The repair head saves this information and uses it to flush packets from its cache.

If there are one or more missing packets, the start sequence number indicates the first missing packet. A bit map must follow. Each bit in the map represents a packet sequence number starting with the start sequence number. If the bit is set, for example, that packet is missing and must be retransmitted.

When the repair head receives an ACK message with a missing packets bit map, the sequence number specified minus 1 is saved for this member. This indicates that all packets prior to and including this sequence number have been received successfully. The repair head then scans the bit map looking for missing packets. It immediately places these packets onto the transmit queue unless they have recently been retransmitted or are already on the queue from another request. Missing packet retransmission receives first priority in the transmission queue, so that packets may be flushed from the transmitter cache.

Also, in accordance with the invention, the cache buffers in the source station, and in the repair head stations, hold packets which have been transmitted but for which an ACK has not yet been received. It is necessary to prevent overflow of this buffer, and accordingly, the "fill level" of this buffer is monitored. A threshold is assigned for the fill level. When the threshold for the fill level is exceeded, the sender station stops sending packets and waits for ACK messages so that it can flush acknowledged packets from its buffer. This wait is a pause in the transmission of packets, and causes the ACK timer in members to expire, and the members then to transmit an ACK message.

Also, in accordance with the invention, the transmission rate of packets by the source station, and by the repair head stations, is dynamically adjusted. Adjustment of the transmission rate of packets is accomplished by causing the sender station to pause between transmission of packets, so that the average transmission rate of packets will have a desired value. The transmission rate should be high so as to fully use the bandwidth of the network, and should be sufficiently low that packets are not lost due to congestion, or to the inability of a receiver station to keep up with the transmitter. Since the bandwidth of the network is unknown, the sender station starts transmitting at an assigned minimum rate, and then starts increasing the rate by adding an increment to its transmission rate at the occurrence of selected events (additive increase). In a preferred embodiment of the invention, the selected event is the transmission of a full set of windows of packets.

Upon receipt of an ACK message indicating that packets have been lost, the transmitting station reduces its transmission rate by multiplying its current rate by a fraction, for example 0.25 (multiplicative decrease). By using an additive increase along with a multiplicative decrease, the transmission rates of each of the transmitting stations adjusts itself to an optimum rate for its network, and its receiving stations.

Accordingly, a transmitting station has a "slow start". That is, the transmitting station begins transmission at a "slow" or minimum rate of packet transmission and slowly increases its rate by "additive increase" until it receives notice that packets are being lost, at which time the transmitting station reduces its transmission rate. After the reduction, the station again begins increasing its transmission rate. The transmission rate therefore oscillates, and attempts to fully utilize the bandwidth of the network.

A key point about the slow start phase of the multicast transmission session is that the historical high rate is established as the maximum rate for which packets were not lost.

A further feature of the invention in retransmission operation is to avoid duplicate retransmission. Whenever an ACK message indicates that a packet must be retransmitted, first a check is done in order to determine if that packet is already in the transmit queue. If the packet is already in the transmit queue, the new ACK request is ignored.

Stable system operation is achieved by the invention. In accordance with the invention, synchronization between feedback, from reading ACK messages, and control in increasing or decreasing the transmission rate, is maintained in order to achieve stable system operation. Synchronization is maintained by requiring the transmitting station to immediately decrease the rate after receiving feedback which indicates congestion. The station is then required to wait for a number of windows before implementing either another decrease or an increase in rate. This wait permits the effect of the change to be felt throughout the network, and for the most recent feedback to be in response to that change.

Pruning of receiving stations from the multicast network is done when a station gives evidence that it cannot keep up with the transmitting station when it is operating at its minimum transmit rate. Evidence that a station cannot keep up appears at the transmitting station as an excessive number of retransmission requests. When the number of retransmission requests becomes excessive, the offending station is dropped (that is, pruned) from the multicast tree.

A still further feature in accordance with the invention is that an "end of packet" beacon frame is transmitted by the source station after all packets of the multicast transmission sequence have been transmitted. This "end of packet" beacon frame informs the various stations of the sequence number of the last packet, so that retransmission requests can be appropriately formulated.

SECOND EXEMPLARY EMBODIMENT

Communications

Figure 2:
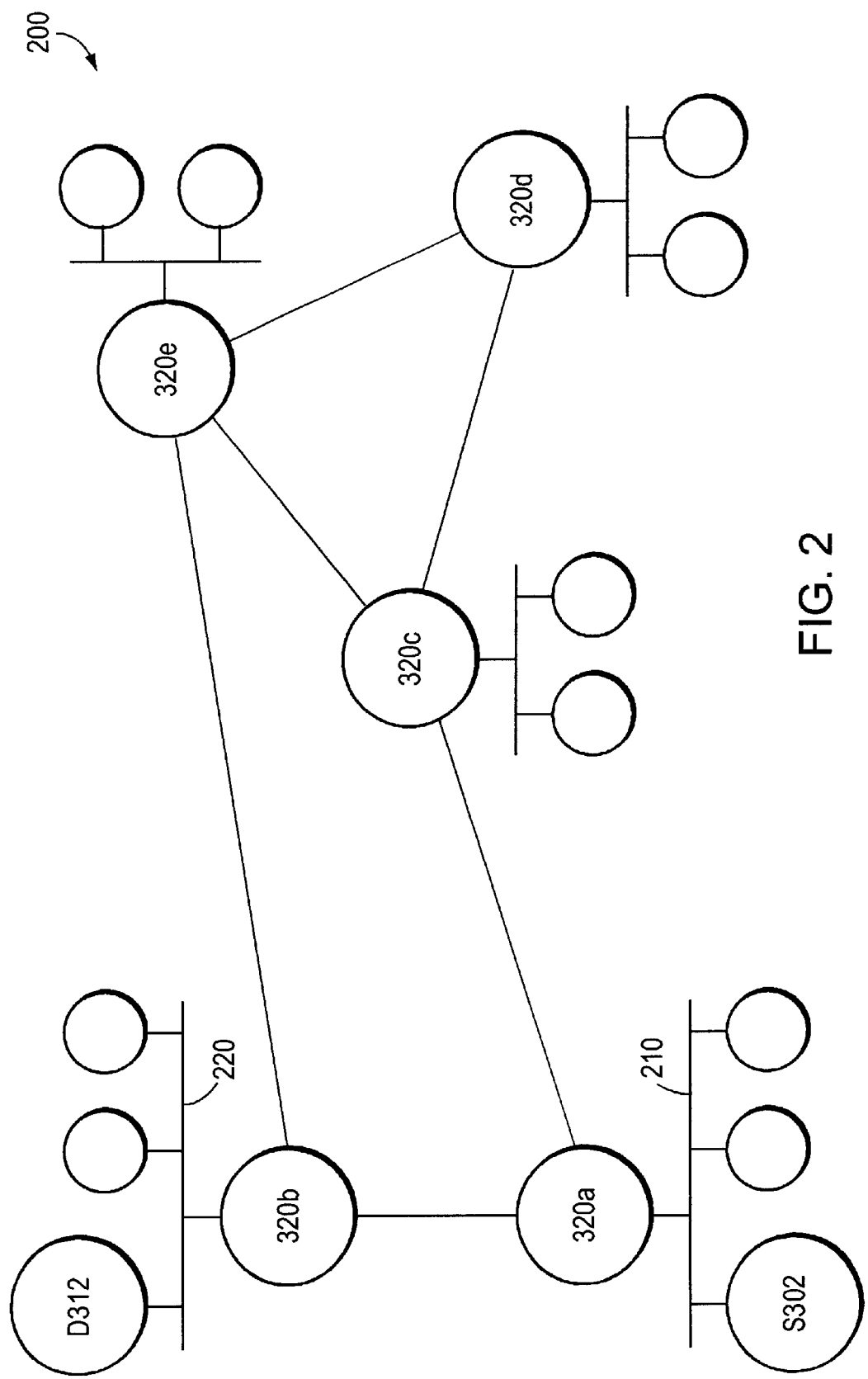
FIG. 2 is a schematic block diagram of a computer internetwork comprising a collection of interconnected communication media attached to a plurality of stations, including end stations.

FIG. 2 is a schematic block diagram of a computer internetwork 200 comprising a collection of interconnected communication media attached to a plurality of stations. The communication media may be configured as local area networks (LANs) 210 and 220, although other media configurations such as point-to-point network links may be advantageously employed. The stations are typically computers comprising source and destination end stations 302, 312, such as personal computers or workstations, and intermediate stations 320a–e such as routers, bridges, switches and/or firewalls. Communication among the stations is typically effected by exchanging discrete data frames or packets between the communicating nodes according to a predefined protocol, such as the Internet protocol (IP), Internet Packet Exchange protocol, AppleTalk protocol or DECNet protocol.

FIG. 3 is a schematic block diagram of a station, generally designated 300, configured to operate in accordance with the invention. The station may comprise any type of station, such as an end station, that is capable of advantageously sending and/or receiving data frame/packet messages in accordance with the protocol of the present invention. The station generally comprises a plurality of interconnected elements, such as a processor 302, a memory 304 and a network adapter 306. An operating system 310, portions of which are typically resident in memory and executed by the CPU, functionally organizes the station by, inter alia, invoking network operations in support of software processes 320 executing on the station.

The memory may comprise storage locations addressable by the processor and by the adapter for storing software programs and data structures associated with the inventive multicast transport protocol. The processor is typically a central processing unit (CPU), although it may generally comprise processing elements or logic configured to execute the software programs and manipulate the data structures. It will be apparent to those skilled in the art that other processor and memory means, including various computer readable media, may be used for storing and executing program instructions pertaining to the techniques described herein.

An exemplary embodiment of the invention is referred to as the Tree based Reliable Multicast protocol, or TRAM model as a shorthand.

Broadly stated, the inventive multicast transport protocol (TRAM) utilizes a hierarchical tree-based multicasting system for transferring identical data from a single sender to multiple receivers (clients). The sender and receiving clients in a multicast session interact with each other to dynamically form repair groups. The repair groups are linked together in the hierarchical tree with the sender at the root of the tree. Each repair group has a receiver that functions as a group head for other receiving clients in the tree. Except for the sender, each repair group head in the system is a member of another repair group.

Group members report lost and successfully received messages to their associated group head using a selective acknowledgment mechanism. The repair heads store ("cache") every message received from the sender, and provide repair services (i.e., retransmission) of messages that are reported lost by the members. Features are also provided to permit the tree structure to adapt depending upon the changes that may occur in the network during the multicast session, so as to permit optimal multicasting during the session.

Each repair head monitors the operation of the members of its respective repair group to ensure that the members are functioning properly. Likewise, each of the members of a given repair group monitor the operation of the repair head associated with that group to ensure proper functioning of the head. If a repair head determines that a member of its group is no longer functioning (e.g., as a result of failure of the member to acknowledge receipt of special monitoring messages after a predetermined number of messages have been transmitted and/or a predetermined time period for response has elapsed), the repair head may prune that member from its group.

Similarly, if a member of a repair group determines that the current repair head that it is associated with is no longer functioning properly (e.g., if the member does not receive special monitoring messages from the head), the member may seek to re-affiliate itself with a different repair head that it has learned of as a result of receipt of monitoring messages from that different head. The members of the group may also re-affiliate themselves with a different repair head if the current repair head with which they are associated resigns from being the repair head for that group. Such resignation may occur if the repair head determines that it is redundant in the region of the system in which it resides.

The flow and congestion control mechanism is generally rate-based and adjustable, based upon network congestion. That is, the transmission rate of multicast data packets is dynamically adjusted based upon the rate at which the receiving clients can accept and process the data packets. A pruning mechanism is also provided whereby receiving clients that are unable to receive and process the data packets at a minimum threshold rate are removed from the tree system.

For example, each multicast data packet transmitted from the sender includes a unique sequence number. Receiving clients utilize these numbers to detect out-of-order and missing packets, and to request transmission of same from the repair head with which it is associated. Each of the repair heads maintains a cache of multicast packets received from the sender and flushes the packets out of the cache after receipt of the cached packets by all of the members of its repair group has been acknowledged. In order to avoid multiple members sending such acknowledgment messages at the same time, and to expedite repair, each member of a repair group selects a random packet between one and a predetermined acknowledgment window size to begin transmission of acknowledgment messages. Using a single acknowledgment message for each respective acknowledgment window, the members acknowledge those packets of that window that have been received and not received. Each repair head computes the average data rate of all packets it receives, and sends retransmissions to the members of its group at this rate.

Congestion is detected at the receiving clients and repair heads, and is used to dynamically adjust transmission rate of packets in the system. More specifically, the receiving clients transmit congestion messages to their repair heads based upon changes in the number of data packets that the receiving clients failed to receive between the preceding two acknowledgment windows. When the repair head receives these congestion messages, it generates a congestion message for each acknowledgment window and forwards that message to its own repair head. Each repair head also generates congestion messages when its data cache (i.e., for retransmission purposes) equals or exceeds a predetermined maximum fill level. The repair head may also adjust upwardly its maximum cache fill level, if possible. The sender adjusts its data transmission rate based upon the congestion it receives as well as its own cache fill level for its immediate group members, while staying within predetermined minimum and maximum data transmission rates.

More specifically, in an exemplary embodiment of the invention, the sender increases transmission rate every second acknowledgment window in the absence of congestion reports. When a congestion report is received, the sender immediately reduces transmission rate and records the window for which the congestion report was generated, and thereafter, the sender does not further adjust transmission rate until a predetermined number N of acknowledgment windows have transpired, wherein N is proportional to the current data transmission rate divided by the historically highest achieved transmission rate.

After each rate decrease, the next increase in transmission rate is equal to the historically highest achieved rate minus the current data transmission rate, divided by a number, for example 4. After receipt of a congestion report, the sender reduces its data transmission rate by a predetermined percentage (e.g., 50% or 25%) of current data transmission rate. The sender's data transmission rate never exceeds, and never falls below, respective predetermined maximum and minimum thresholds.

The sender notifies all members of the session when it has completed data transmission by transmitting a beacon packet that includes the sequence number of the last data packet transmitted. The sender retransmits this packet periodically until all of the members of its immediate repair group have acknowledged receipt of all packets sent.

When a member receives the beacon packet, it immediately sends an acknowledgment to its repair head indicating whether it has received all of the packets transmitted, or requires packet retransmission. If the beacon from the sender is received, but a member has not acknowledged receipt of all data packets, a monitoring message is transmitted from the repair head associated with that member. If the member does not acknowledge receipt of such message to the repair head sending the monitoring message, the repair head may retransmit the monitoring message. If, after a predetermined number of retransmissions of the monitoring message, the member has still failed to acknowledge receipt, the repair head prunes the member from the tree. When all members have either acknowledged receipt of all data packets to the repair head or have been pruned from the tree, the repair head terminates its session.

A summary of the various facets of the flow and congestion control technique follows:

A. Congestion Detection and Feedback

Repair Tree

Receivers are organized into a tree, with a sender being at the root of the tree. The tree is used primarily for distributing the load of retransmitting lost packets, but also serves as a channel for aggregating feedback from receivers to the sender. This tree is referred to as the repair tree. ACKs and scattering them apart.

Each multicast packet has a sequence number. The multicast packets are grouped into windows, each window having a predetermined number of packets, for example, packets (with sequence numbers) 1–32 are grouped into Window 1, packets 33–64 are grouped into Window 2, etc. For each window full of packets, a receiver reports to its parent (in the repair tree) those packets in the window that were received and those which were lost. Notably, each receiver in the group associated with the parent tries to choose a different point in the window to report to its parent, so that the parent does not receive a flurry of reports at once. The parent is responsible for retransmitting the lost packets to its children. To fulfill this function, the parent keeps all packets that have not been reported as received. These packets are preferably kept in a retransmission buffer.

Congestion Detection

Either of the following two conditions triggers congestion feedback:

(a) a receiver sees its count of missing packets increase from one window to the next; or, (b) a receiver which is a repair node (non-leaf repair head) in the repair tree determines that its retransmission buffer has reached a high water mark (e.g. 4 ACK windows of packets).

Congestion Feedback

Congestion feedback includes the following information:

The window during the reception of which the condition occurred.

The id of the reporting child. The congestion feedback is sent by the receiver to its parent.

It is usually sent as part of an ACK message.

Feedback Aggregation and Propagation

Each parent keeps track of the latest window for which a congestion report has been made. If a congestion feedback contains a window number no higher than the last counted window reported, it is ignored; otherwise, it is propagated up towards the root of the tree (and the latest window at the current node is reset).

The sender, at the root of the tree, also keeps track of the latest window for which congestion has been reported, and discards congestion reports with equal or older window numbers.

B. Rate-based Flow Control

At the sender, packets are scheduled for transmission according to a pre-determined rate. This is achieved by injecting the right amount of sleep time between packet departures so that the average data rate matches the predetermined rate. After each packet transmission, the sender computes the following:

$$sleep=(packet\_size/rate)-time\_spent$$

where time_spent is the time since the beginning of transmission of the last packet. If sleep is positive, the sender waits this amount of time before the next packet is transmitted. This schedule transmits packets at the predetermined rate on average, with the least amount of burstiness for a predetermined packet size.

C. Rate Adjustments

Overview

The rate is adjusted based on congestion feedback, staying in between a pre-configured minimum and maximum rate. The goal is to adaptively find the optimal rate based on the available bandwidth of all the links involved and the speed of all the receivers involved. In the absence of congestion feedback, the rate is gradually increased; in response to congestion, the rate is decreased. A key is how exactly to increase and decrease so as to adapt to the changing optimal rate quickly, while minimizing oscillation due to overshooting, undershooting and other non-optimal behavior.

Since the network bandwidth is unknown, the amount of adjustment to the rate in the face of congestion (or lack thereof) is adaptively determined. For example, if the bottleneck bandwidth is 100 Mb/s, then increasing 10 Kb/s at a time is too small; on the other hand, if the bottleneck bandwidth is 100 Kb/s, increasing 1 Mb/s at a time is too large.

One adaptive technique is to increase or decrease the rate by a percentage (e.g., 10%) of the current rate. Using this technique, following a period of severe congestion the current rate would be very low; 10% of that low rate would lead to a long time, if not failure to recovery.

Rate oscillation is by design the way to adapt to the network as it changes over time. Even if the network stays still, the sender will keep increasing its rate in the absence of congestion until it senses congestion, and decrease its rate. The ideal outcome is to oscillate by a small amount (say +/−25%) around the optimal bandwidth.

In reality, the oscillation is often much wilder because congestion sensing is not done in the network itself, but by receivers when losses are detected (a technique for the network itself to detect and report congestion requires changes to existing network protocols and expending precious network resource on monitoring work). By the time congestion is reported, the condition is already serious. Typically the sender hears a lot of congestion reports when it happens. Reacting to all of them usually means over correcting, hence increased oscillation. The following adaptive algorithms are incorporated into the inventive rate adjustment technique.

Initial Network Sensing Phase

As mentioned previously, there is a pre-configured maximum rate. The rate controller does not increase the rate beyond this maximum. In the beginning phase of transmission, the sender uses fractions of the maximum rate as the initial rate and increment. For example, initial rate=10% of maximum rate increment=10% of maximum rate The increment is added to the current rate when no congestion is sensed after a small number of windows of packets transmitted, for example 2 windows. At the first time congestion is reached, a "historical high rate" is remembered. From that point on, the amount the rate is increased each time is based on this historical high. Later, when a new high is reached, the historical high is replaced by the new value. The initial phase of searching for the historical high is referred to as the "initial network sensing phase" (analogous to the "slow start phase" in TCP).

Rules for Decreasing the Rate.

When a congestion report is received, the sender decreases the rate by a percentage (for example 50%) without going below the minimum rate. Decreasing by a percentage is a relative value. It adapts to different networks. The use of a rather large value, for example 50%, is justifiable because when congestion is detected the rate typically has already gone far beyond the optimal rate.

Rules for Increasing the Rate

After a decrease, a new amount for rate increase is calculated as:

$$(historical\_high-current)/k$$

where k is a small number, for example 4. This means whenever there is no congestion, this amount is added to the current rate. This rule for increasing the transmission rate aims to get back to the recently experienced estimated optimal rate in no more than k steps. When applying a rate increase, the maximum rate is checked to ensure that it is not exceeded. Rate limit based on actual_rate monitoring.

Due to the following factors, the current transmission rate is not a good indicator of current throughput (e.g., that achieved during a window):

(a) Pause due to exceeding maximum packets out;

(b) Pause caused by congestion feedback.

The sender monitors its actual achieved rate for each interval between successive rate changes. This includes transmission of both new packets and retransmission of old packets. After a rate increase, if the new rate is higher than the actual_rate, the rate is reset to the average of the new rate and the actual_rate. By limiting the rate from becoming too far ahead of the actual rate, this algorithm makes the transmission less bursty and avoids losses in some scenarios, without significantly affecting long term throughput.

How Often to React to Congestion Feedback

The receivers report congestion (or lack thereof) every window full of packets (as part of the ACK). The window size is one of the basic parameters of a multicast session. If not configured, a default is used. The sender reacts to congestion (or lack thereof) for every n windows, where n is a function of the following factors:

current rate.

historical high rate.

latency information (from receiver to sender).

number of levels of repairers between senders and receivers.

For example, one such function might be:

$$n=\max\{N, (current\_rate/historical\_high*M)\}$$

where N and M are constants, such as 2 and 4.

The reason for not reacting to every window is to try to keep the control and feedback in phase (so that the feedback is usually reflecting the effect of the last control). The reasons for making the interval variable (by calculating n) are two fold:

(1) When the current rate is high relative to the historical high rate, it is more likely to be near congestion again, hence more important to keep feedback and control in phase, and (2) When the current rate is relatively low, the time needed to send a window full of packets is relatively longer, so the formula keeps the frequency relatively constant in terms of time.

Limit on Unacknowledged Packets in the Network

The sender temporarily stops sending packets over the network if more than H windows of packets are in the network without any report of their status, where H is a constant, for example 4. This is used to limit the extent the receiver and sender get out of synch with each other.

D. Retransmissions

Rate Used to Send Retransmission

The sender uses its current transmission rate to schedule retransmissions. Each repairer uses the average rate (from the beginning of transmission to current time) as the rate to schedule retransmission. Retransmissions go out before new packets at the sender. Additional information in feedback to account for retransmission.

Congestion feedback may contain additional information to help the sender deal with congestion. These are:

(a) If the congestion report comes from a receiver in the leaf of the tree, it may contain the number of missing packets at this receiver; this helps whoever is to do the repair for this receiver estimate the amount of time needed;

(b) If the congestion report comes from an interior node in the reporting tree, it may contain the time estimate for doing retransmissions.

Such information is aggregated at the sender. After doing a rate decrease due to congestion, the sender pauses an amount of time based on such additional feedback, in order to let the receivers catch up.

The scalable, reliable multicast transport protocol (TRAM) supports bulk data transfer with a single sender and multiple receivers of a computer internetwork, such as an intranet or Internet. In one aspect of the invention, TRAM uses reliable multicast repair trees that are optimized to implement local error recovery, and to scale to a large number of receivers without substantially impacting the sender. In another aspect of the invention, the protocol includes a flow and congestion control technique that enables reliable, efficient and fair operation of TRAM with other protocols across a wide variety of link and entity characteristics of the computer internetwork.

THIRD EXEMPLARY EMBODIMENT

General Discussion of the Hierarchical Repair Tree

The TRAM model is tree-based. The ACK reporting mechanism is window-based, including optimizations to reduce burstiness and processing overhead. The flow control mechanism is rate-based and adapts to network congestion. The sender senses and adjusts to the rate at which the receivers can accept the data. Receivers that cannot keep up with a minimum data rate can be dropped from the repair tree.

Some of the major features of TRAM are:

Reliability

TRAM guarantees delivery of data to any receiver in the tree and is able to keep up with the minimum transmission speed specified by the sender. While this level of guarantee cannot ensure applications against delivery failure, features can be used to closely keep track of individual members' status.

Rate-based Flow Control and Congestion Avoidance

TRAM schedules packet transmission according to a data rate. This data rate is dynamically adjusted based on congestion feedback from the receivers. Congestion feedback is aggregated by repair heads through the tree. The algorithm used to adjust the rate works in different network topologies. The rate is bounded by maximum and minimum rates configured at the sender station.

Feedback to the Sender

Each member of the tree periodically reports statistics to its repair head. This includes statistics that assist in building the tree in dynamic tree embodiments of the invention (for instance, the number of available repair heads on the tree) as well as reports on congestion conditions. Reports on congestion conditions from repair heads allow the sender to adapt its data rate to network conditions. This information is aggregated at each level of the tree in order to reduce control traffic to the sender.

Controlling Memory Use

Each repair head is responsible for ensuring that the data is received by all of its members. This means that a repair head must cache data until it is sure that all of its members have received it. TRAM requires positive acknowledgments from members when data is received. This enables repair heads to reclaim cache buffers containing data that has been received by all members.

Repair Group Management

Both members and repair heads monitor each other to detect unreachability. Non-responsive members can be dropped from the repair group and corresponding cache buffers can be reclaimed. Non-responsive repair heads can be abandoned by their members in favor of an active repair head. Repair heads are also responsible for detecting receivers which cannot keep up with the minimum transmission rate specified by the sender. While such members cannot be dropped from the multicast group, they can be denied repair head support and receive no repairs.

Scalability

TRAM has been designed to be scalable in many situations, such as large numbers of receivers and sparsely or densely populated receiver groups. TRAM also accommodates wide ranges of receiver capabilities. Control message traffic is designed to be limited in all of these cases.

Flow Control

TRAM is designed to transfer bulk data from one sender to many receivers. The data is transmitted at a rate that adjusts automatically between a specified minimum and maximum. Sequence numbers in the data packets allow receivers to identify missing packets. Each member is bound to a repair head that retransmits lost packets when requested. Acknowledgments sent by receivers contain a bitmap indicating received and missing packets. Missing packets are repaired by the repair head. Packets acknowledged by all members are removed from the repair head's cache. The following sections describe in detail the mechanisms for transmitting data, requesting retransmission of lost packets, detecting congestion, adjusting the transmit rate, late join requests, and handling end of transmission.

Data Transmission

The sender in a TRAM application transmits data packets to every receiver in the multicast group. TRAM sends the packets at a specified rate. Each packet is given a unique sequence number starting with one (1). Receivers use these numbers to detect out of order and missing packets.

Acknowledgments

Members acknowledge one window of packets at a time to their repair head. This window is known as the ACK window. The ACK window size is configurable; the default is 32. For example, in the default case, members send ACKs every 32 packets.

To avoid multiple members sending ACK messages at the same time, and to possibly expedite repairs, ACK messages are distributed over the window. Each member selects a random packet between 1 and the ACK window size to start sending ACK messages. For example, one member may send ACKs at packets 32, 64, 96; etc., while another sends ACKs at packets 10, 42, 74, etc.

Acknowledgments are also sent if a timer equal to 1.5 times the estimated ACK interval expires. The estimated ACK interval is computed at each receiver when an ACK is sent. It estimates the amount of time it takes to receive an ACK window's worth of packets. The formula is:

*ACK* interval=*ACK* window*(Time since last *ACK*/Packets since last *ACK*)

This timer is canceled if an ACK is sent using the triggering mechanism described above. If this timer expires, it indicates that the sender has paused and allows members to report and recover any lost packets without having to wait for the sender to start sending new data.

Each ACK message contains a start sequence number and a bit map length. If no packets were missing, the bit map length is "0" and the sequence number indicates that all packets prior to and including this packet were successfully received. The repair head saves this information and uses it to remove packets from its cache.

If there are one or more missing packets, the start sequence number indicates the first missing packet. A bit map must follow. Each bit in the map represents a packet sequence number starting with the start sequence number. If the bit is set, that packet is missing and must be retransmitted. A bit map length indicates how many valid bits are present.

When the repair head receives an ACK message with a "missing packets" bit map, the sequence number specified minus 1 is saved for this member. This indicates that all packets prior to and including this sequence number have been received successfully. The repair head then scans the bit map looking for missing packets. It immediately places these packets onto the transmit queue unless they have recently been retransmitted or are already on the queue from another request.

Data Retransmissions

When a repair head receives a request to retransmit a packet, it retransmits it as soon as possible. Retransmissions take priority over new data packets. Retransmitted packets are sent at the current rate used for new data packets from the sender. Each repair head computes the average data rate of all packets it receives and sends retransmissions at this rate.

Duplicate Retransmission Avoidance

When several members request retransmission of the same packet, TRAM sends the packet immediately for the first request. Subsequent requests are ignored if they are received within 1 second of the first request.

Occasionally packets are waiting for retransmission due to rate limitations. If a new request for a packet is received and that packet is awaiting retransmission, the request is ignored.

Every repair head in TRAM keeps track of the lowest packet sequence number that all members have received. Before a repair head retransmits a packet that has been waiting to be retransmitted, it again checks the sequence number of the packet to be retransmitted against this lowest packet number. If the retransmission packet sequence number is lower, the repair head skips this retransmission because all of its members have already acknowledged the receipt of the packet. This can happen when multiple repair heads retransmit the same packets and their transmission range overlaps.

Rate-based Flow Control

Even with unicast transports, flow and congestion control is a delicate problem. The flow control in TRAM is rate-based and is similar to a rate-based unicast protocol.

TRAM's packet scheduler computes the amount of time to delay each packet in order to achieve the desired data rate. The delay is computed with the formula:

packet size/desired rate

The overhead in processing the packet is subtracted from this delay. TRAM then sleeps for the calculated period, sends the packet, and the cycle continues. This is similar to the widely known token bucket algorithm.

TRAM's flow control uses various algorithms such as slow start and congestion control to dynamically adapt to network conditions. A maximum and a minimum rate can be specified to limit the operation of these algorithms. The minimum rate effectively defines the receiver population. Any receiver that cannot keep up with the minimum rate will be pruned (no longer guaranteed repairs).

If packets are lost or ACKs are not reaching a repair head, its cache will start to fill up. If the sender's cache fills up above a threshold value, it stops sending new data until it can free some buffers from its cache. This bounds how much the sender and receivers are allowed to get out of synch.

TRAM sessions go through two phases of flow control: slow start; and congestion control. The slow start phase is the initial phase during which TRAM carefully tests the network to find an appropriate operating point. This is analogous to TCP's slow start. After the slow start phase, TRAM will have established some boundaries for its operation and enters the congestion control phase.

Slow Start

During the slow start phase, the initial data rate starts at 10% of the maximum, or the minimum rate if that is greater. Every two ACK windows this rate is increased another 10% of the maximum data rate. This process continues until the maximum rate is reached or congestion causes the rate to decrease.

Congestion Reporting

Congestion is detected at the receivers and repair heads. Receivers detect and report congestion based on missing packets. Repair heads detect and report congestion based on their cache usage.

At Receivers

Receivers detect and report congestion based on an increase in the number of missing packets between two ACK windows. For example, if a receiver detects 5 missing packets during an ACK window, and has 10 packets missing in the next window, a congestion message is sent to its repair head. The congestion message contains the highest sequence number received. When the repair head receives the congestion message, it determines whether this is a new congestion report and if so, forwards it immediately up to its repair head. Each repair head will forward one congestion packet from its members for each ACK window. The repair head computes the ACK window from the sequence number specified in the congestion message with the formula:

sequence number/*ACK* window size.

Once a congestion message for an ACK window has been forwarded up the tree, congestion reports for its ACK window and previous ACK windows will be ignored. The sender does not react to multiple congestion reports for the same window.

At Repair Heads

Repair heads also generate congestion messages when their data caches begin to fill up. Each repair head maintains a low and high water mark on its cache. When the number of packets in the cache reaches the high water mark, an attempt is made to purge the cache. If it can't purge the cache below the high water mark because a member has not acknowledged these packets, a congestion message is forwarded up the repair tree. In this situation the repair head temporarily increases its high water mark to the current value plus the number of packets in an ACK window. The repair head performs the same test when this new temporary high water mark is reached. If the cache is exhausted, new packets are dropped without acknowledging them.

The sequence number in a repair-cache-generated congestion message is the highest sequence number the repair head has received.

At The Sender

The sender also maintains a cache for its immediate group members. If its cache fills up to the high water mark and can't be reduced, it reacts as if it received a congestion message for that window. It also temporarily increases its high water mark to the current value plus the size of an ACK window. If the cache fills to this new level and can't be reduced, it reacts again.

This process continues until the cache is full. At this point the sender blocks any new data from the application and attempts to solicit an ACK from the members that are causing the cache to fill up. If these members do not respond quickly, they may be pruned.

When some cache buffers are freed, the application can start sending data again.

In experiments, we observe that the repair head's cache-generated congestion messages almost always follow the receivers' loss-generated congestion messages. This is logical as the build-up in the repair head's cache is invariably caused by the lost packets at the receivers.

Congestion Control

The sender reacts to congestion feedback as follows: react to selected congestion reports; decrease the rate in the face of congestion; and, increase the rate in the absence of congestion.

The only significant experience with real network congestion control is based on TCP traffic and the algorithms implemented in the TCP protocol. One of the key ingredients of TCP's algorithm is to follow the additive increase/multiplicative decrease rule.

The Increase Amount

Since TRAM transmission is rate based, an immediate problem is determining the right rate increase in the absence of congestion. TCP is a window based protocol in which increases are done by incrementing the congestion window by one, a dimensionless parameter. In the spirit of TCP, the correct amount to increase TRAM's rate would be a small fraction of the bottleneck bandwidth. Plus, this amount would need to be adopted by all the flows sharing the same bottleneck. This increase is not easily determined.

A constant increase amount will always be wrong for some topologies. Although we used 10% of the maximum rate for slow start, it does not seem suitable since the maximum rate may be far from the current bottleneck rate. Instead, TRAM derives the increase amount dynamically as follows. TRAM keeps track of the historically highest achieved rate (HHR). After each rate no decrease, a new increase amount is calculated as:

$$\text{Increase}=(HHR-\text{current\_rate})/S$$

The rationale is to use HHR as a local estimate of the bottleneck bandwidth. Within a small number of steps "S" (for example, in a preferred embodiment S is set to equal 4), TRAM tries to return to that level if there is no congestion. The constant S may be changed from its initial value of 4 in response to further experimentation; a larger number might be adopted for potentially more equitable bandwidth sharing by many flows in exchange for slower convergence to the optimal rate.

An immediate reaction to this formula would be to replace HHR with something that adapts to the current network condition, for instance, using the most recently achieved high (MRH), or a moving average of MRH, or the session average data rate. Each of these cases resulted in diminishing increases for some common topologies, eventually leading to a rate close to zero.

Decrease

The receipt of a congestion report causes the data rate to drop by a percentage (for example 50%, and we are also experimenting with 25%). This is the same as TCP. Adjusting the rate by a percentage is very appealing since the adjusted amount is dimensionless, hence there are no calibration problems.

Synchronizing Feedback And Control

The next important aspect of a congestion control scheme is how to keep the feedback and control in synchrony with each other. Ideally, each control action is based on the feedback from the network that reflects the consequence of the previous control. From systems theory, we know that there is a chance of building a control that leads to optimal and stable behavior.

If our feedback does not capture the consequence of the previous control, then we are likely to end up with a control that reacts to the same conditions repeatedly and leaves the system in wide oscillation. This oscillation is indeed what we observed in our simulation experiments if we increase the rate for each window when there is no congestion, and decrease for each window when there is congestion.

In order to make sure that each congestion feedback includes the previous control actions, the congestion control algorithm must wait for several windows before acting on the feedback. This tends to make the system less responsive to topologies with a small number of receivers.

As a compromise, TRAM increases the rate every other ACK window in the absence of congestion reports. When a congestion report is received, TRAM decreases the rate right away and records the window in which the congestion happened. Another increase or decrease in rate is not allowed until after N windows, where N is:

$$N=4*(\text{rate}/HHR)$$

Where 4 is simply 2 times the normal schedule of reacting to every 2 windows.

The reasons for using a variable schedule are: at lower rates, the risk of congestion is less hence it is fairly safe to increase the rate sooner; at lower rates, the time penalty for waiting an additional window is longer.

Accounting For Retransmission

To further improve the congestion control algorithm, TRAM includes mechanisms to take into account the effect of retransmission when determining the rate during periods of congestion.

In the congestion message, the receivers report an estimate of how long it will take to do local repairs. This information is aggregated back to the sender. In reaction to a congestion message, the sender not only reduces its rate, but also pauses briefly to let the local repairs complete.

This mechanism has further smoothed out the oscillations in our simulation experiments.

Congestion Control Simulation and Results

To support the design of TRAM, we built a simulation model using the NS simulation tool. The NS simulation tool used was version 2 of the Network Simulator, http://www.mash.cs.berkeley.edu/ns. The TRAM protocol is modeled using the simulation tool NS. The object-oriented simulation environment, the scripting language support, plus the companion animation tool, NAM, enable effective experiments.

Many different network topologies were simulated.

Figure 4A:
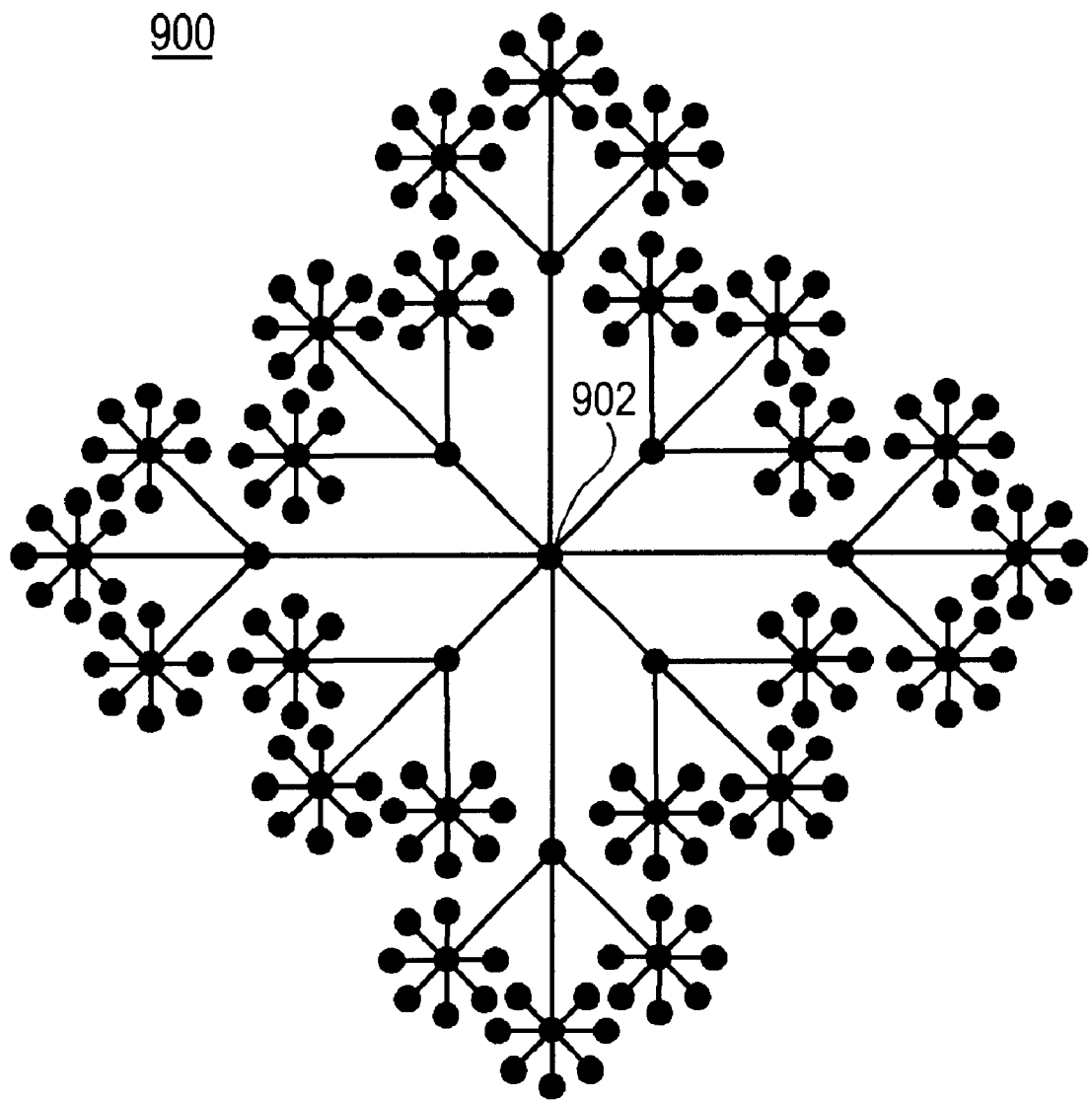
FIGS. 4A, 4B, and 4C are schematic diagrams of a network with many stations formed into repair groups, and the diagrams represent a model used for simulation.
Figure 4B:
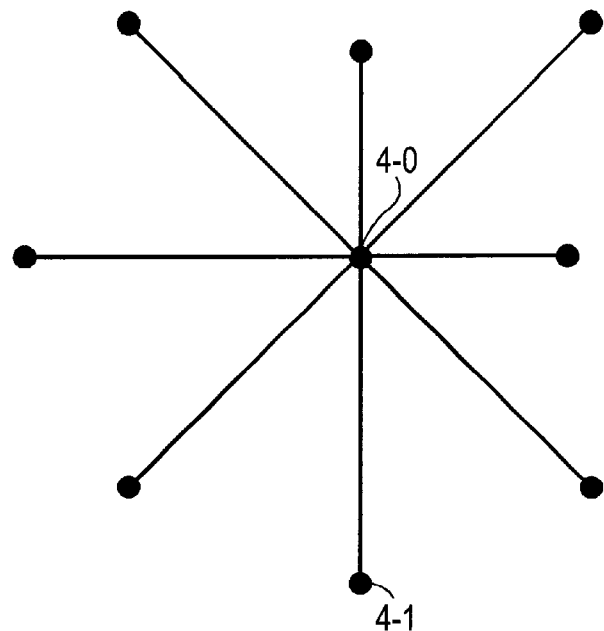
Figure 4C:
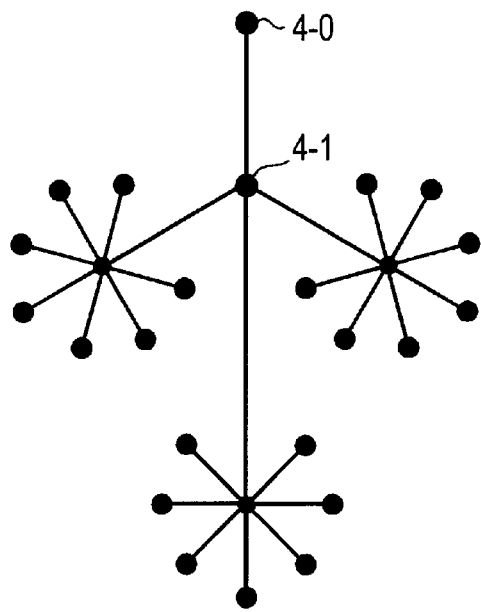

Turning now to FIGS. 4A, 4B and 4C, a network topology 900 used in simulation is shown. The results from two variants of the topology shown in FIGS. 4A, 4B, and 4C. are disclosed. The basic network consists of two hundred one (201) nodes. The sender agent 902 runs on one node, repairer agents run on 24 of the nodes, and pure receiver agents run on 168 of the nodes. The other 8 nodes are router-only nodes. The whole network is symmetric. Each repairer is 2 hops away from the sender, and each receiver is 1 hop away from its parent (repair head). The links from the sender to the first tier routers are 1.5 Mb/s links with 50 msec delay. The rest of the links are 1.5 Mb/s links with 10 msec delay, except 3 of these links are 0.5 Mb/s links with 10 msec delay. These 3 slow links are the bottleneck of the multicast session.

In the variation of this topology, the 3 slow links are further programmed to deterministically go up and down. Every 3 seconds, they go down for 0.05 seconds. On average the down time is less than 2%.

The experiment is to send 1000 packets, 1400 bytes each. The sending starts at 1.5 seconds from the beginning of the simulation. Since the limiting bandwidth is 0.5 Mb/s, assuming ideal scheduling the whole transmission should take 22.4 and 23 seconds respectively.

Figure 5:
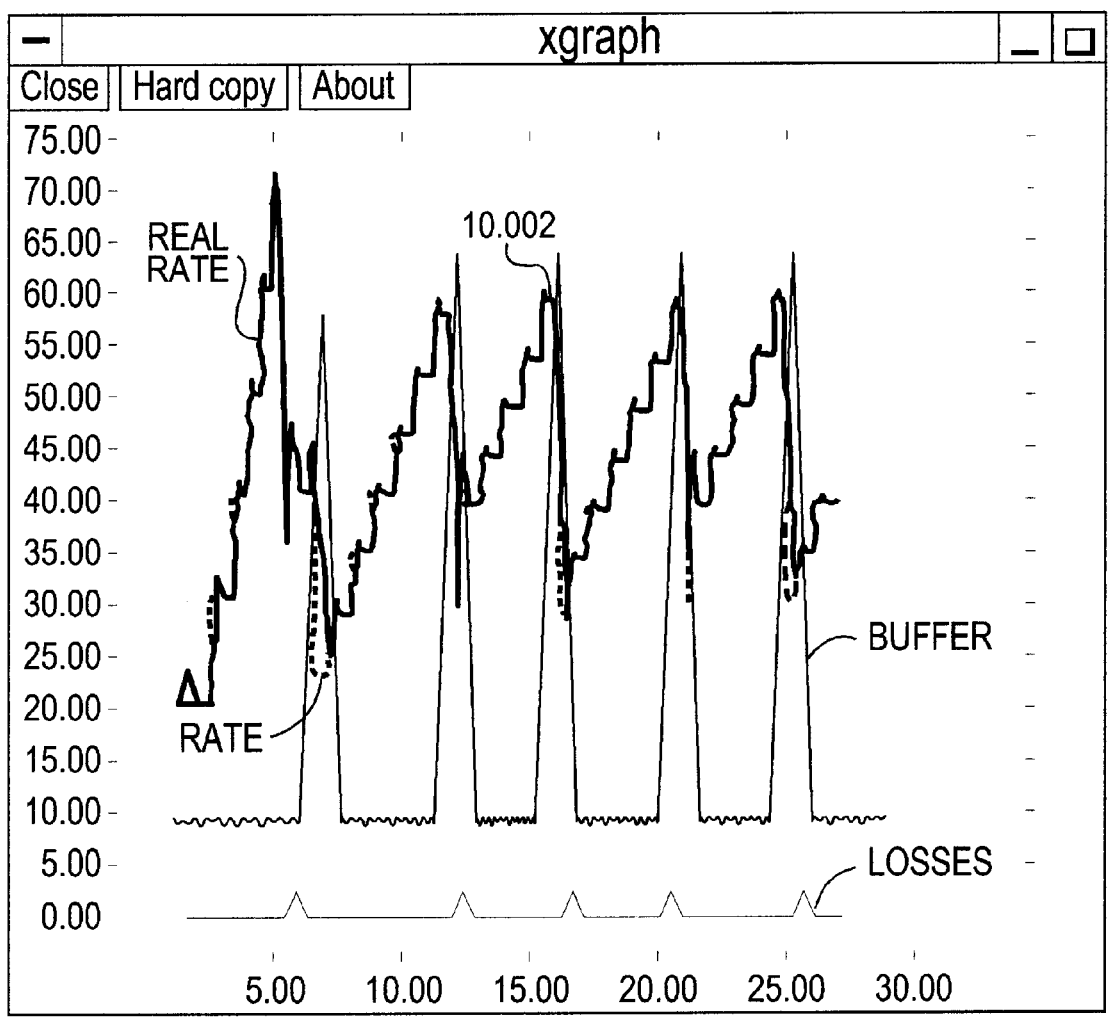
FIG. 5 is a graph of the response of a simulated network.
Figure 6:
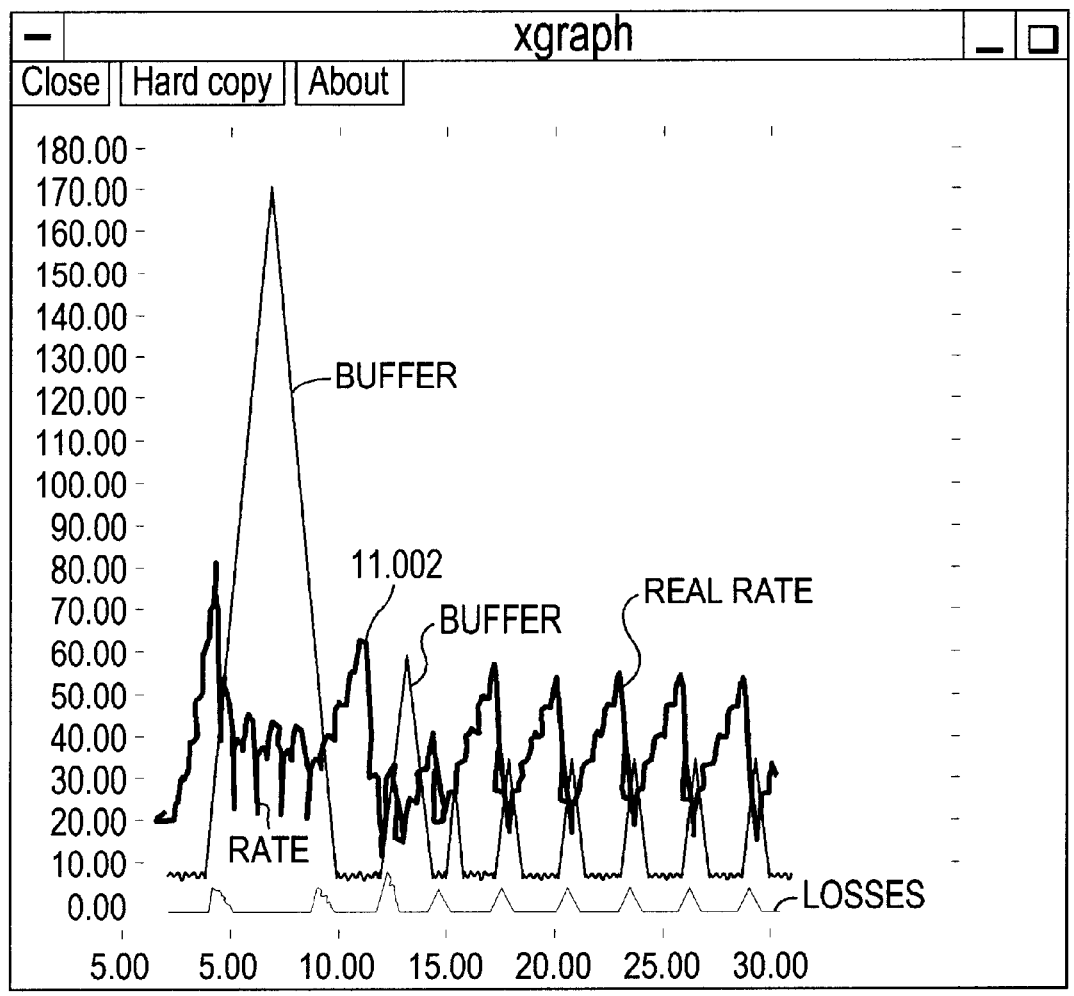
FIG. 6 is a graph of the response of a simulated network.

FIG. 5 and FIG. 6 show how TRAM did for each of the two cases. The X axis is time in units of seconds. The Y axis scale is used for a number of things:

Rate: in 10 Kb/s (i.e. 50=0.5 Mb/s)

Loss: number of packets lost at ACK time

Cache occupancy: number of packets

FIG. 5 is a graph 10,002 showing results for a network without up/down dynamics.

FIG. 6 is a graph 11,002 showing results for a network with up/down dynamics.

FIG. 5 for a static 201 node network is next discussed. The top curves represent the monitored rate and the send rate. The next curve is the cache occupancy observed at a repair head that is responsible for a receiver that is behind the slow link. Losses are shown along the bottom. As can be seen, the buffer occupancy shoots up soon after the losses start to occur.

For the static network in FIG. 5, the maximum possible transmission rate, as limited by the bottleneck bandwidth, is 50 (Kb/s). TRAM manages to keep the rate oscillating between 30 and 60. The initial spike is bigger, the result of slow start when there is no hint what the possible maximum rate is. The subsequent improved performance is what we expected.

The fact that the cache occupancy oscillates at around 7 in the steady state is normal. In these tests, the ACK window is set to 8. With ACK staggering, the cache usage is expected to stay around 8, instead of going from zero (0) to eight (8) and back to zero (0) in a saw-tooth form.

FIG. 6 shows results for the simulation network of FIG. 4 and including adding up/down dynamics to some links. In FIG. 6, the link up/down dynamics clearly induce very periodic losses at the times the links turn off (every 3 seconds). TRAM adapts quite well, except right after the first link down, when the losses induced a high cache occupancy. This is because a retransmission failed to get to the receiver behind the faulty link for quite a long time. After it overcame the initial difficulty, the rate oscillated between 30 and 60 as in the static network case. The time of completing the test is only marginally longer than the static network case.

Late Joins

Receivers joining the multicast group after data transmission has started have two options for recovering data previously sent:

Recover as much data previously sent as possible. This option allows the receiver to request retransmission of all the previously sent data that its repair head has cached. A repair head typically has at least the last 50 packets sent, in its cache.

Don't recover anything sent before the receiver joined. This option doesn't attempt to recover any previously sent packets. The first data packet received after the new member joins the repair tree is handed up to the application. All previously sent packets are ignored.

End Of Transmission

Receivers must be able to determine when the session has completed to ensure they have received all of the data before exiting.

When the sender application completes, end of transmission is signaled throughout the multicast group. The sender notifies all members of session completion with a beacon packet that has the TXDONE flag set. This packet also includes the sequence number of the last data packet sent. The sender transmits this packet periodically until all of its immediate members acknowledge the receipt of all packets sent. The sender can then exit.

When a member receives the beacon packet with the TXDONE flag set, it immediately sends an ACK message to its repair head indicating whether it has received all the packets transmitted or requires more retransmissions. TRAM notifies the application when it receives all of the packets.

When a repair head receives the beacon packet with the TXDONE flag set, it communicates with its repair head just as a receiver does. The repair head must wait for all of its members' to acknowledge all packets before it can close the session. If a member requires retransmission, the repair head must retransmit all the packets required of its members prior to closing itself. If the beacon from the sender with the TXDONE flag set is received but one or more members have not acknowledged all packets, a Hello message is sent to these members with the same information contained in the beacon packet. Members receiving this Hello message must respond in the same way that they would if they received the beacon. If the repair head still doesn't hear from its members after sending the Hello, it retries several times. After a period of time it gives up on the member and removes it from the member list.

When all members have either acknowledged all packets to the repair head or have been removed from the member list because they were not responsive, the repair head can close its session.

Pruning

In a multicast data distribution setup, the source of a multicast stream can operate in a mode that is sensitive or insensitive to the data reception feedback from the receivers. The drawbacks of being insensitive are a lack of response to network congestion and an inability to deliver the data to as many receivers as possible. Being sensitive makes the multicast distribution mechanism overcome the above drawbacks but also introduces a new drawback that may make the sender operate at a rate that is slower than what is desired by the application. To overcome this drawback, it is necessary that the multicast delivery system support some sort of a pruning mechanism which enables receivers that do not meet the reception criteria to be isolated and removed from the repair mechanism.

In TRAM, the reception characteristics of all the receivers is distributed knowledge. The sender knows of the reception characteristics of its immediate members while some other repair heads in the system know the reception characteristics of some other set of receivers. Due to the distributed nature of reception characteristics, TRAM adopts a collaborative pruning technique that involves the sender and all the repair heads in the system.

The technique requires the sender to orchestrate the pruning operation by providing a MinimumDataRate signal. The signal is included in the header of multicast data and beacons sent by the sender. The signal is set to OFF when no congestion is being reported from the sender.

As a result of receiving congestion feedback information from one or more receivers, the sender attempts to reduce the rate of transmission to accommodate the slow receivers.

The sender sets the MinimumDataRate signal ON when the sender is operating at the minimum rate specified by the application. The MinimumDataRate signal informs repair heads in the distribution tree to prune any poorly performing receivers. The repair heads may respond to receiving the MinimumDataRate signal by pruning members.

Pruned members can be members that are slow, members that are requesting excessive repairs or members that have become unresponsive as a result of a network partition or for some other reason. The members that are pruned are notified of membership termination via the HelloUnicast message. The repair head may stop honoring repair requests from members that are pruned.

Note that repair heads can independently perform the pruning operation (i.e., without a sender signal). This may result in premature pruning of the members, as the repair heads may not know whether or not the sender is operating at the configured minimum rate.

FOURTH EXEMPLARY EMBODIMENT

General Description of Computer Communication Protocols

Communication in a computer internetwork involves the exchange of data between two or more entities interconnected by communication media. The entities are typically software programs executing on hardware computer platforms, such as end stations and intermediate stations. In particular, communication software executing on the end stations correlate and manage data communication with other end stations. The stations typically communicate by exchanging discrete packets or frames of data according to predefined protocols. A protocol, in this context, consists of a set of rules defining how the stations interact with each other.

The hardware and software components of these stations generally comprise a communications network and their interconnections are defined by an underlying architecture. Modern communications network architectures are typically organized as a series of hardware and software levels or "layers" within each station. These layers interact to format data for transfer between, e.g., a source station and a destination station communicating over the internetwork. Predetermined services are performed on the data as it passes through each layer and the layers communicate with each other by means of the predefined protocols. Examples of communications architectures include the Internet Packet Exchange (IPX) communications architecture and, as described below, the Internet communications architecture.

The Internet architecture is represented by four layers which are termed, in ascending interfacing order, the network interface, internetwork, transport and application layers. These layers are arranged to form a protocol stack in each communicating station of the network.

Figure 7:
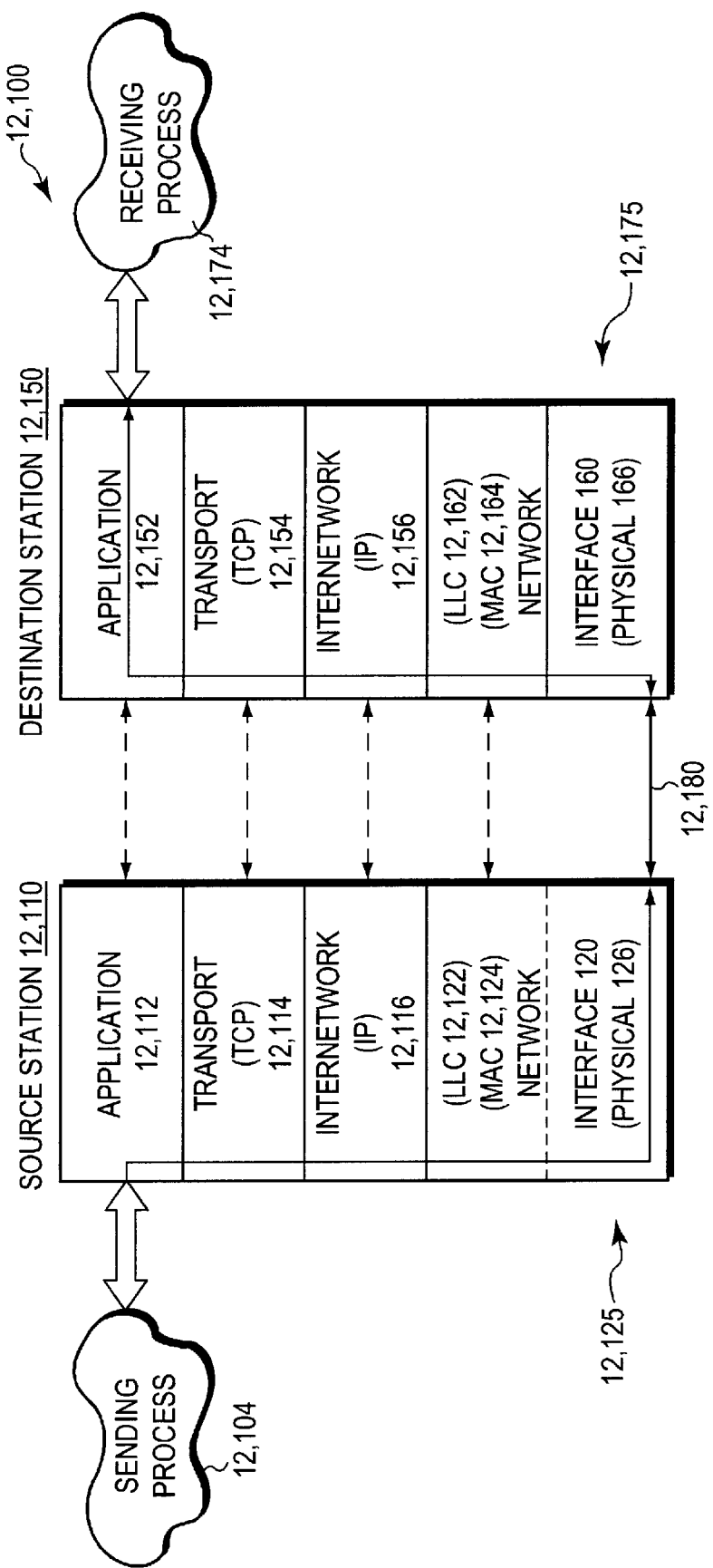
FIG. 7 is a block diagram of protocol stacks for communication between computers.

Turning now to FIG. 7, there is illustrated a schematic block diagram of prior art Internet protocol stacks 12,125 and 12,175 used to transmit data between a source station 12,110 and a destination station 12,150, respectively, of an internetwork 12,100. As can be seen, the stacks 12,125 and 12,175 are physically connected through a communications medium 12,180 at the network interface layers 12,120 and 12,160. For ease of description, the protocol stack 12,125 will be described.

In general, the lower layers of the communications stack provide Internetworking services and the upper layers, which are the users of these services, collectively provide common network application services. The application layer 12,112 provides services suitable for the different types of applications using the internetwork, while the lower network interface layer 12,120 accepts industry standards defining a flexible network architecture oriented to the implementation of local area networks (LANs).

Specifically, the network interface layer 12,120 comprises physical and data link sublayers. The physical layer 12,126 is concerned with the actual transmission of signals across the communication medium and defines the types of cabling, plugs and connectors Is used in connection with the medium. The data link layer is responsible for transmission of data from one station to another and may be further divided into two sublayers: Logical Link Control (LLC 12,122) and Media Access Control (MAC 12,124).

The MAC sublayer 12,124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 12,122 manages communications between devices over a single link of the internetwork.

The primary network layer protocol of the Internet architecture is the Internet protocol (IP) contained within the internetwork layer 12,116. IP is a network protocol that provides internetwork routing and relies on transport protocols for end-to-end reliability. An example of such a transport protocol is the Transmission Control Protocol (TCP) contained within the transport layer 12,114. The term TCP/IP is commonly used to refer to the Internet architecture. Protocol stacks and the TCP/IP reference model are well-known and are, for example, described in Computer Networks by Andrew S. Tanenbaum, printed by Prentice Hall PTR, Upper Saddle River, N.J., 1996, all disclosures of which are incorporated herein by reference.

Data transmission over the internetwork 12,100 therefore consists of generating data in, e.g., sending process 12,104 executing on the source station 12,110, passing that data to the application layer 12,112 and down through the layers of the protocol stack 12,125, where the data are sequentially formatted as a frame for delivery onto the medium 12,180 as bits. Those frame bits are then transmitted over an established connection of medium 12,180 to the protocol stack 12,175 of the destination station 12,150 where they are passed up that stack to a receiving process 12,174. Data flow is schematically illustrated by solid arrows.

Although actual data transmission occurs vertically through the stacks, each layer is programmed as though such transmission were horizontal. That is, each layer in the source station 12,110 is programmed to transmit data to its corresponding layer in the destination station 12,150, as schematically shown by dotted arrows. To achieve this effect, each layer of the protocol stack 12,125 in the source station 12,110 typically adds information (in the form of a header) to the data generated by the sending process as the data descends the stack.

For example, the internetwork layer encapsulates data presented to it by the transport layer within a packet having a network layer header. The network layer header contains, among other information, source and destination network addresses needed to complete the data transfer. The data link layer, in turn, encapsulates the packet in a frame, such as a conventional Ethernet frame, that includes a data link layer header containing information, such as MAC addresses, required to complete the data link functions. At the destination station 12,150, these encapsulated headers are stripped off one-by-one as the frame propagates up the layers of the stack 12,175 until it arrives at the receiving process.

In many cases, the destination of a data frame ("message") issued by a source ("sender") May be more than one, but less than all of the entities ("receivers") on a network; this type of multicast data transfer is typically employed to segregate communication between groups of receivers on the network. IP multicasting, in particular, may be used to disseminate data to a large group of receivers on the network. However, any number of data messages may be lost in transit due to errors or overloading of networking equipment. Ensuring that each receiver/member of a multicast group has received all of the data messages is difficult for a single sender to determine once the group is of any size, since messages from each member to the sender can overload the sender.

One approach to providing scalable reliable multicasting is to organize the receivers into a tree structure so that each internal "node" of the tree is responsible for helping its subordinates recover any lost packets and communicating status back to the sender. Many conventional algorithms exist for constructing such a tree. For example, reliable multicast protocols such as TMTP and RMTP build trees that are used for an entire data transfer session without optimization. Lorax describes methods for generally enforcing member limits. After such a tree is constructed, it may be further optimized as network conditions change.

To effect IP multicasting, a sending process generally specifies a destination IP address that is a multicast address for the message. Receiving processes typically notify their internetwork layers that they want to receive messages destined for the multicast address; this is called "joining a multicast group". These receiving members then "listen" on the multicast address and, when a multicast message is received at a receiver, it delivers a copy of the message to each process that belongs to the group. The result is that the message traverses each link between the sender and receivers only once. When the sender issues a sequence of messages, a multicast flow occurs.

Flow and congestion control for multicast transport is a relatively new research topic. For minutes of an Internet Research Task Force meeting on this topic in September 1997, see http://www.east.isi.edu/RMRG/notes-revO.html. In general, flow and congestion control algorithms adaptively find an optimal (transmission) rate for a multicast flow, based on available bandwidth of all links involved in the transmission and the speed of all the receivers involved.

When a multicast flow competes with other flows (multicast or unicast) for network resources, the flow and congestion control algorithm should exhibit some level of fairness in using the congested resources.

Adaptive control of transmission rate is based on feedback from the network, as is done in unicast flows. A multicast flow tends to traverse more links and depend on the speed of more receivers than a unicast flow. This dependence on more resources makes the multicast flow control problem substantially more complicated than the case for a unicast flow. The present invention is directed to an efficient flow and congestion control technique for multicast flows.

The present invention generally relates to a scalable, reliable multicast transport protocol (TRAM) that supports bulk data transfer with a single sender and multiple receivers of a computer internetwork, such as an intranet or Internet. In one aspect of the invention, TRAM uses reliable multicast repair trees that are optimized to implement local error recovery and to scale to a large number of receivers without substantially impacting the sender. In another aspect of the invention, the protocol includes a flow and congestion control technique that enables reliable, efficient and fair operation of TRAM with other protocols across a wide variety of link and entity characteristics of the computer internetwork.

FIFTH EXEMPLARY EMBODIMENT

Further features of TRAM, the Tree based Reliable Multicast protocol are disclosed in this fifth exemplary embodiment of the invention.

TRAM is a tree based reliable multicast protocol. TRAM enables applications requiring reliable multicast to be essentially free of transport related issues like:

Transmission of data between the sender and the receivers reliably.

Direct interaction between the sender and receiver applications.

Congestion control, ACK: implosion and other scalability issues.

Further, TRAM requires no prior knowledge of the receiver community. Also, scalability is non-trivial in former reliable multicast technology, and TRAM achieves this by dynamically grouping the tuned receiver community into hierarchical groups. Grouping enables TRAM to avoid the ACK/NACK implosion problem and to perform local repair operations.

The invention provides many features, for example the features of the invention include: reliable multicast; single source to many receivers; scalable—ability to support a large receiver community; support local repair; support adaptive congestion control mechanisms to prevent network flooding; ordered data delivery; support unidirectional and multidirectional multicast environments during the initial building of the tree and for late joins, and reaffiliation during data transfer; control bandwidth used by multicast control messages during tree formation anti data transfer; scalable up to a million receivers; late joins without data recovery; support for real-time data and resilient category of applications; and, unordered data delivery.

Introduction To Reliable Multicast

Multicasting provides an efficient way of disseminating data from a sender to a group of receivers. There are wide range of applications that can gain by adopting this technology for their data delivery. While some of the applications can function well in an unreliable setup, some of the applications do require reliability for their proper functioning. The degree of reliability required for applications requiring reliable multicast support varies from application to application. The RM group forming within the IRTF has broadly classified the applications requiring multicast into the following categories:

Bulk Data.

Live Data Resilient Streams.

Shared Data.

Hybrid.

Figure 8:
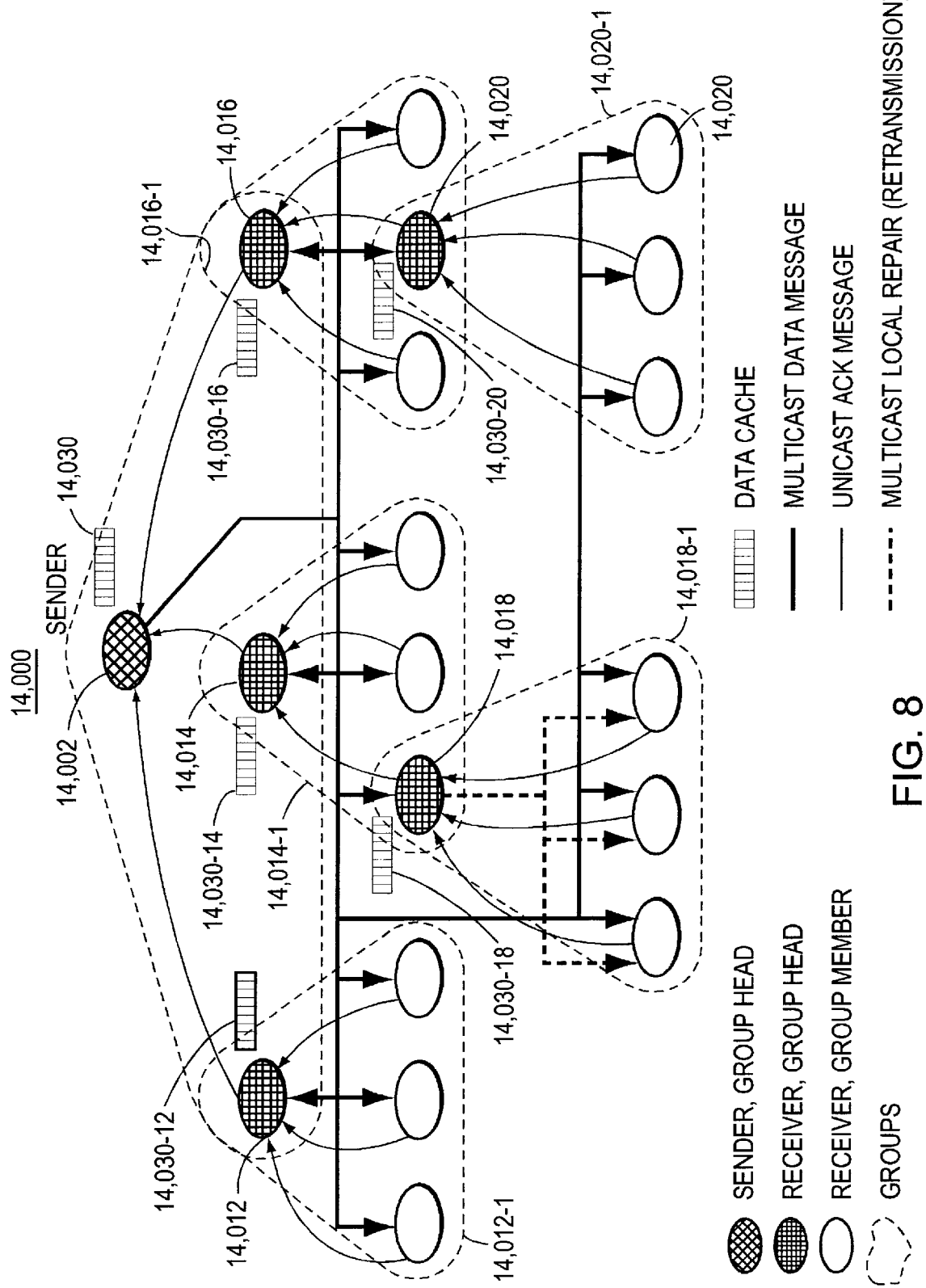
FIG. 8 is a block diagram showing a multicast repair tree.

Turning now to FIG. 8, a brief description of the TRAM model follows. The receivers in TRAM are dynamically grouped into hierarchical groups to form a tree 14,000. The sender 14,002 is at the head of the tree. The parent 14,012; 14, 014; 14,016; 14,018; 14,020 of each respective group 14,012-1; 14014-1; 14,016-1; 14,018-1; 14-020-1 is a repair head. Data is multicast by the sender and all the receivers receive it. The repair heads in the tree cache the received data messages. The members of a group need not cache the data. Caches 14,030-X are shown for each respective repair head. The members send acknowledgments of receiving the data to the associated/affiliated head. The heads can free the cached data messages upon receiving acknowledgments (ACK messages) from all the members. When members detect loss of a message, they send retransmission requests (NACK messages) to the affiliated heads. The group heads retransmit the requested message with a local TTL scope that is large enough to reach all its members.

RxGroup, RxGroup-head, RxGroup-member and RxNode

Figure 9:
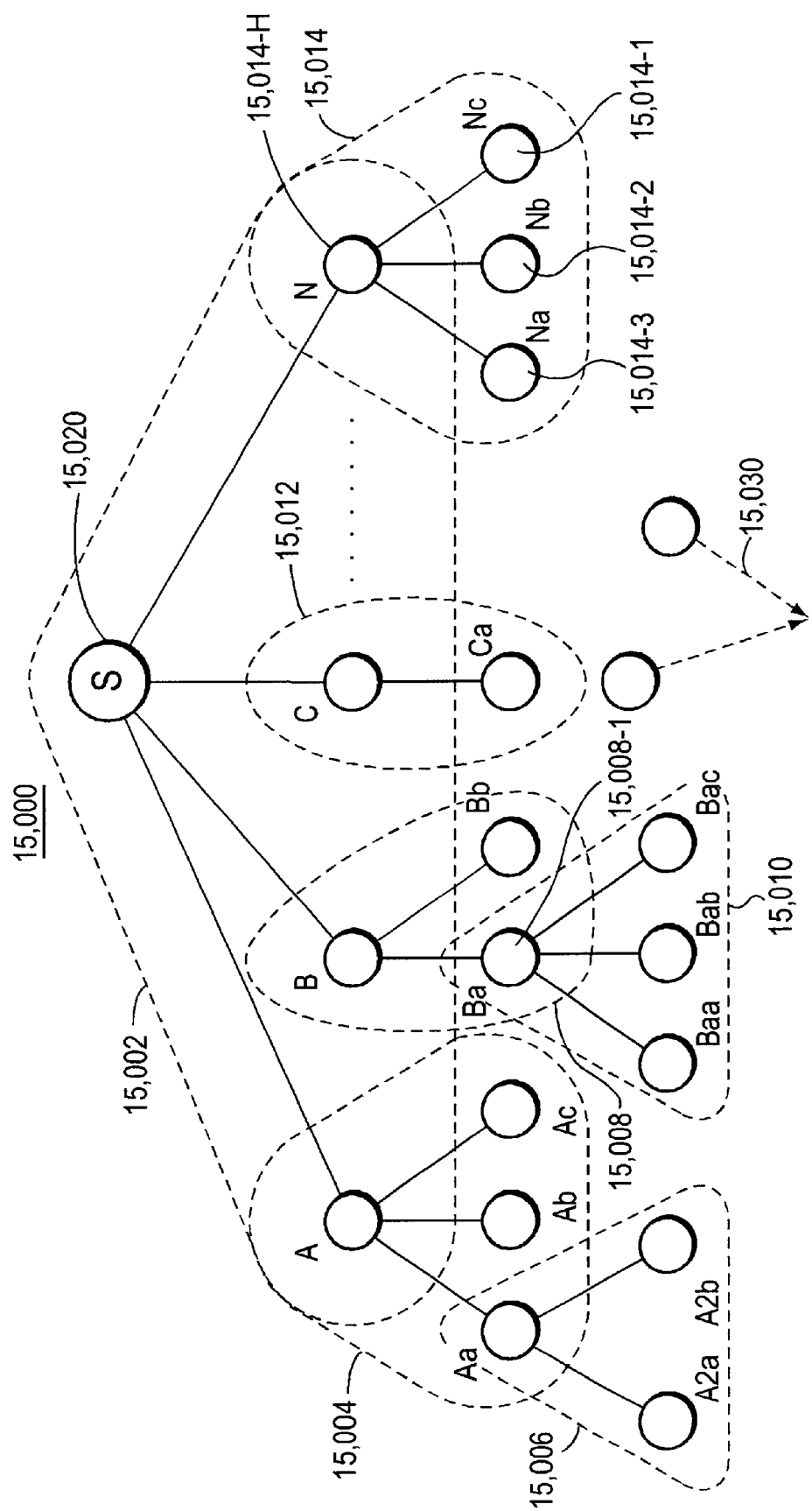
FIG. 9 is a block diagram of a multicast tree showing receiver group relationships.

Turning now to FIG. 9, a block diagram 15,000 showing RxGroup relationships is shown. For each multicast data stream, TRAM dynamically organizes the tuned receiver community into multi-level hierarchical groups 15,002; 15,004; 15,006; 15,008; 15,010; 15,012; 15,014 named RxGroups. Every RxGroup comprises of a group head known as RxGroup-head and a configurable number of group members known as RxGroup-members. For example, for RxGroup 15,014, the group head 15,014-H, and members 15,014-1; 15,104-2; 15,014-3 are shown. The transport supporting the sender 15,020 application is by default a RxGroup-head. A RxGroup in which the transport supporting the sender operates as the group head is known as a Primary-RxGroup, and all the rest as Secondary-RxGroups. A RxGroup-Member of one RxGroup can in turn play the role of a group head to its lower level RxGroup, as member 15,008-1 of group 15,008 is a group head for group 15,010.

A RxGroup-head is primarily responsible for caching the sent/received multicast data to participate in local repair/retransmission operations. Multicast messages received by the RxGroup-members are acknowledged with the aid of unicast ACK messages. The ACK messages are sent to the respective RxGroup-heads to distribute and overcome the ACK implosion problem. The ACK reporting is done using a window mechanism.

A receiver node which is not part of any RxGroup or is in the process of affiliating to a RxGroup is known as a RxNode, as illustrated by RxNode 15,030.

The HState information is maintained and advertised by TRAMs that are currently performing the role of a RxGroup-head. This information is included in the RxGroup Management messages that are multicast with a local scope. The RxGroup-members use the HState information to decipher the current state of a RxGroup-head in the neighborhood. The different HState states are:

Accepting_Members.

Not_Accepting_Members.

Resigning.

Figure 10:
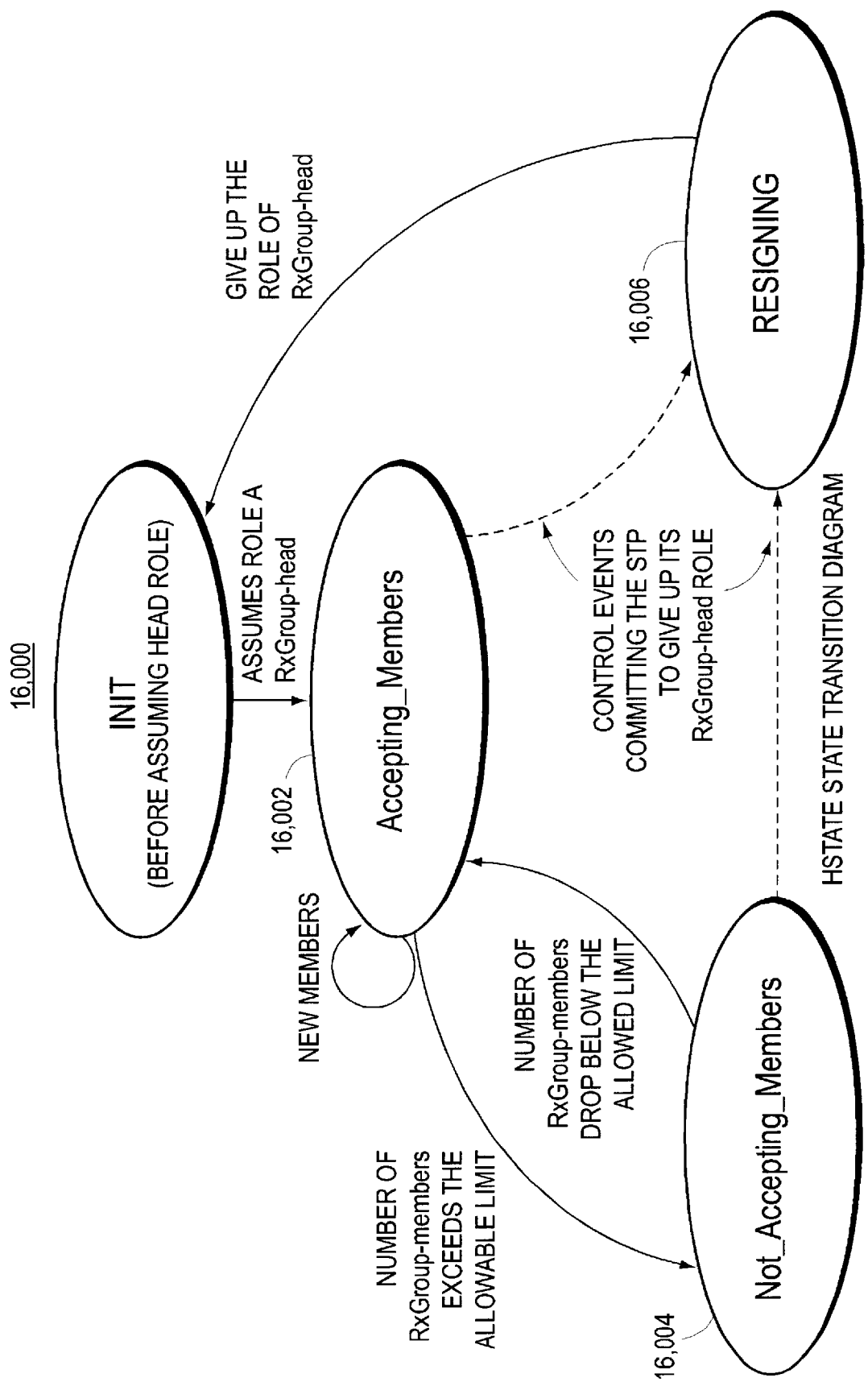
FIG. 10 is a block diagram of a HState transition diagram.

Turning now to FIG. 10, there is shown an HState transition diagram 16,000.

The Accepting_Members state 16,002 indicates that the RxGroup-head has the potential of accepting new RxGroup-members, and Not_Accepting_Members 16,004 state means the opposite. Resigning state 16,006 means that the RxGroup-head is in the process of giving up the RxGroup-head role and is indicating to its dependent RxGroup-members to re-affiliate to a different RxGroup-head.

Re-affiliation of RxGroups

Re-affiliation is triggered when a group member decides that it wants to affiliate with a different head. This may occur because its old head is resigning or not responding, or because the member has discovered a better head (in terms of closeness). A functioning head can typically resign when the user is attempting to exit out of the multicast group, or when the functioning head has determined itself to be redundant in the region. Detection of a better head and redundant heads in a region are made possible by reception and processing of various multicast control messages generated by the heads and members in a region. The various steps involved in the re-affiliation process are listed below:

1. A member decides to re-affiliate. It finds a head that it wants to re-affiliate to (by checking Hellos, HAs, or using MTHA).

2. The member uses the normal TRAM affiliation mechanisms to affiliate with the new head (sending a Head Bind and receiving an Accept Member or Reject Member). If this affiliation fails, it goes back to step 1 (finding a head).

3. Once the member has affiliated to the new head, it maintains its affiliation to its old head until it successfully receives all missing packets that are earlier than the starting sequence number of the packets that is guaranteed to be cached by the new head. The new head reports the starting sequence number of the packets that will be cached via the AM message. During this interval, the member sends ACKs to both the old and the new heads (unless the old head is dead). If the new head becomes unresponsive during this interval, the member goes back to step 1 (finding a head). This interval is known as the Transition Interval.

4. Once the Transition Interval has been completed, the member sends an ACK with the Terminate Membership bit set to its old head. At this point, reaffiliation is complete and the member and the old head forget about each other.

During re-affiliation, if the member is itself a head, it continues to function as a head and is not allowed to accept new members.

The whole re-affiliation process is straightforward and simple when the re-affiliating member is not performing the role of a head. When the re-affiliating member is performing the role of a head, certain additional checks have to be performed while selecting the new head so as to avoid forming malformed repair tree or loops. Typically a loop can be formed when a head higher up in the tree hierarchy re-affiliates with a head that is a descendent of itself. TRAM avoids the loop formation by propagating a tree level information called RxLevel as part of the tree management information. The sender is said to be at RxLevel 1, the heads that are members of the sender's RxGroup are said to be at RxLevel 2 and so on. Loops are avoided by adopting the policy that a member performing the role of a head will not re-affiliate with any head whose RxLevel is equal or greater that its own RxLevel. Further, a head upon losing its heads is unable to find a suitable head for more than 5 minutes is forced to resign. This is important, since members of an unaffiliated head are disconnected from the sender. They may not receive repairs and cannot provide congestion feedback.

Data Transmission

The Sender in a TRAM application multicasts data packets to all of the receivers in the multicast group. The application calls the putPacket method (or write method for the stream interface) to queue up packets for transmission. The output dispatcher sends the packets at the specified rate. Each packet is given a unique sequence number starting at one (1). Receivers use these numbers to detect out of order and missing packets.

Data Retransmissions

When the sender receives a request for retransmitting a packet, it queues the requested packet up immediately. Retransmissions take priority over new data packets. Retransmitted packets are sent at the same rate as regular data packets from the sender. Repair heads compute the average data rate of all packets it receives and sends retransmissions at this rate.

Duplicate Retransmission Avoidance

When several members request retransmission of the same packet, TRAM sends the packet immediately for the first request. Subsequent requests are ignored if they are received within a chosen time interval, where in an exemplary embodiment of the invention the chosen time interval is one (1) second of the first request.

Occasionally many packets are queued up waiting for retransmission. If a new request for a packet is received and that packet is already on the transmit queue, the request is ignored.

Acknowledgments

Reliable transmission in TRAM is achieved with acknowledgments. Members use an ACK window to trigger sending an acknowledgment message to their repair head. The ACK window expires when a packet with a sequence number greater than or equal to the end of the next window arrives. For example:

If the ACK window is 32 packets, each member sends an ACK when packet 32, 64, and 96 arrives.

To distribute the arrival of ACK messages, each member selects a random packet between 1 and the ACK window to start sending ACK messages. In our example above the start point for sending ACK might be packet 10. In this case the member sends an ACK message when packet 10 (or greater) arrives, another at packet 42, the third at packet 74, and so on.

Each ACK message contains a start sequence number and a bit mask length. If no packets were missing the bit mask length is zero (0) and the sequence number indicates that all packets prior to and including this packet were successfully received. The repair head saves this information and uses it to remove packets from its cache.

If there are one or more missing packets, the start sequence number indicates the first missing packet. A bit mask must follow. Each bit in the mask represents a packet sequence number starting with the start sequence number. If the bit is set, that packet is missing and must be retransmitted. A bit mask length indicates how many valid bits are present.

When the repair head receives an ACK message with a missing packets bit mask, the sequence number specified minus one (1) is saved for this member. This indicates that all packets prior to this sequence number have been received successfully. The repair head then scans the bit mask looking for missing packets. It immediately places these packets onto the transmit queue unless they have recently been retransmitted or are already on the queue from another request.

Flow Control

In TRAM the sender maintains a data rate between a minimum and maximum specified rate. The rate is increased every two (2) ACK windows and decreased for each new congestion report. If the senders data cache fills up, the sender stops sending new data until it can reduce its cache below the high water mark.

The actual rate scheduler is implemented as follows. When the application places a packet on the transmit queue, the output dispatcher sends the packet on the multicast socket. It then computes the amount of time to delay in order to achieve the desired data rate. The delay is computed with the formula:

$$\text{packet size/desired rate}$$

The overhead in processing the packet is subtracted from this delay. The output dispatcher then sleeps for the calculated period and the cycle continues.

Slow Start

The initial data rate starts at 10% of the maximum or the minimum rate if that is greater. Every two (2) ACK windows this rate is increased another 10% of the maximum data rate. This process continues until the maximum rate is reached or congestion causes the rate to decrease.

Congestion Reports

Congestion reports from the receivers, in an exemplary embodiment of the invention, cause the data rate to drop 25%. After congestion the rate increments are more conservative in an attempt to alleviate the congestion. The new rate increment is computed from the previous rate increment value as follows:

$$\text{new rate} = \text{current rate} + ((\text{last increment rate} - \text{current rate})/4)$$

This algorithm allows the data rate to increment quickly back to the point where congestion was reported.

Congestion Control

Congestion is detected at the receivers and repair nodes. Receivers detect and report congestion based on missing packets. Repair heads detect and report congestion based on their cache content.

Rate Based Congestion Detection

Receivers detect and report congestion when the number of outstanding missing packets between two ACK windows increases. For example:

If a receiver detects five (5) missing packets during the last interval and has ten (10) packets missing in the next interval, a congestion message is sent to its repair head. The congestion message contains the highest sequence number received. When the repair head receives the congestion message, it determines whether this is a new congestion report and if so, forwards it immediately up to its repair head. Each head will forward one congestion packet from its members for each ACK window. The head computes the ACK window from the sequence number specified in the congestion message with the formula:

sequence number/ACK window

The repair head will send one congestion message up the tree for each ACK window. Once a congestion message has been forwarded up the tree, congestion reports for previous ACK windows will be ignored. The sender will also ignore any congestion messages for the same or earlier windows.

Cache Based Congestion Detection

Repair heads also generate congestion messages when their data cache begins to fill up. Each head maintains a low and high water mark on their cache. When the number of packets in the cache reaches the high water mark, an attempt is made to purge the cache back to the low water mark. If it can't purge the cache below the high water mark because a member has not acknowledged these packets, a congestion message is forward up the repair tree. In this situation the repair head increases its high water mark to the current value plus the number of packets in an ACK window. The repair head performs the same test when this new threshold is reached.

The sequence number in repair cache generated congestion message is the highest sequence number the head has received.

Late Joins

If a receiver joins the multicast group after data transmission has started, it has two options in TRAM.

Recover as much previously sent data as possible. This option allows the receiver to ask for retransmissions of all the previously sent data that its repair head has cached. A repair head typically has at least the last 50 packets sent in its cache.

Do not recover anything sent before the receiver joined. This option doesn't attempt to recover any previously sent packets. The first data packet received after the new member joins the repair tree is handed up to the application. All previously sent packets are ignored.

Both of the above options require that the receiver join the multicast repair tree before any data is given to the application. The method setLateJoinPreference is used to select one of the options listed above. Valid arguments to this call are:

LATE_JOIN_WITH_LIMITED_RECOVERY
LATE_JOIN_WITH_NO_RECOVERY

End Of Transmission

When the sender application closes the socket, end of transmission is signaled throughout the multicast group. The sender notifies all members of this with a beacon packet that has the TXDONE flag set. This packet also includes the last data packet sequence number sent. The sender transmits this packet periodically until all of its immediate members acknowledge the receipt of all packets sent. The sender can then close its session.

When a member receives the Beacon packet with the TXDONE flag set, it immediately sends an ACK message to its head indicating whether it has received all the packets transmitted or requires more retransmissions. The receiver returns a SessionDone Exception to the application when the application has received all the packets.

When the repair head receives the Beacon packet with the TXDONE flag set, it communicates with its head just as a receiver does. The head must wait for all for all of its members to respond with their final ACKs before it can close the session. If a member requires retransmission, the head must retransmit all the packets required of its members prior to closing itself. If the Beacon from the sender with the TXDONE flag set is received but one or more members do not respond with their final ACK message, a Hello message is sent to these members with the same information contained in the Beacon packet. Members receiving this Hello message must respond in the same way they would had they received the Beacon. If the head still doesn't hear from its members after sending the Hello, it retries several times. After a period of time it gives up on the member and removes it from the member list.

When all members have either sent their final ACK message to the head or have been removed from the member list because they were not responsive, the head can close its session.

TRAM Operation

TRAM operation is best described by considering the TRAM protocol at the sender and at the receiver separately.

TRAM at the Sender

The sender application opens the TRAM session by specifying the transport profile. The transport profile includes details such as the multicast address, port, minimum and maximum rates of transmissions, Transport mode, and various other protocol related parameters. The sender TRAM, after validating the transport profile, joins the multicast group. As the Transport mode in this case is SEND_ONLY, the transport assumes the role of Group-head and starts generating the sender-beacon to initiate the RxGroup formation process. TRAM relies upon the application to decide when it is appropriate to start the multicast data transmission. TRAM maintains information such as the size of the tuned receiver community at anytime which can be polled by the application to make this decision.

As the application provides the multicast data to be transmitted, the messages are put on DataQ and are scheduled for transmission at the rate controlled by the slow start mechanism. The slow start mechanism involves starting the data transmission at a minimum rate and gradually increasing the data rate in steps until a suitable maximum rate is achieved. Under congestion, the sender TRAM opts to transmit at the minimum rate so as to alleviate and allow repair operations to take place. Sender TRAM provides no data rate guarantees other than attempting to hand over multicast data to the underlying network layer with in the transmission framework specified by the application. The rate at which the data messages are handed over to the lower layer is with reference to the messages on the DataQ (or messages that are being transmitted for the first time) and do not take into account the messages that are being retransmitted.

The data message is encapsulated in a TRAM header message and is sent to the multicast group. The TRAM header among other things, include a sequence number which enable the receiver TRAMs to order (if required) and detect packet loss. After transmission, the message is moved to the Retrans-Q. The RxGroup-members use a window mechanism to acknowledge the receipt of the multicast messages. The message on the RetransQ undergoes the state transition (described earlier) before being freed. If data cache usage is found to be above the high water mark, then the congestion control and analysis operation on the RetransQ is initiated to isolate and recover from the condition.

The RxGroup-members upon detecting data loss, requests retransmission from the RxGroup-head. The sender performs the retransmissions using the local TTL scope. If a retransmission request is made for a message that has been released from the data cache, the sender informs the unavailability of the message via a Hello message. This is one of the rare occasions when the sender TRAM generates a Hello message.

The DATA_END sub message type in the data message indicates the end of data transmission. Further, to enable the receivers to identify that the data transmission has ended, the sender continues to send a few sender-beacons with data transmission complete bit set in the flag space. The sender-beacon also includes the sequence number of the last message. This will enable the receivers that may have missed the last message request retransmissions from their heads. When all the data messages have been successfully received, the members can terminate their RxGroup membership. The RxGroup-heads have to stay on until every member acknowledges every message on the RetransQ. Optionally the sender TRAM can be configured to remain active for a specified interval of time to gather certain statistics related to the multicast data transmission. The sender-beacon is used under this condition to maintain the RxGroup relationship.

TRAM at the Receiver

The receiver application starts the TRAM session by specifying the transport profile. The receiver TRAM, after validating the transport profile, joins the multicast group and stays idle until the sender-beacon is received. Upon receiving the sender-beacon or the multicast data message or a HA message from another node (as described hereinbelow), the receiver TRAM starts participating in the RxGroup-formation process.

A RxGroup-member intending to be a RxGroup-head can optionally cache the multicast data before actually assuming the role. RxNode(s) can receive and store the multicast messages on their RetransQ but are not allowed to seek retransmissions until they are affiliated to a RxGroup-head. The receiver TRAMs acknowledge the received multicast messages with the help of the ACK messages.

RxGroup-members willing to perform the role of the head can send HA messages. The RxGroup-member starts performing the role of a head upon receiving the first AM (as further described hereinbelow) from a RxNode. The Hello messages are initially generated using the extracted TTL from HB messages (as further described hereinbelow). If the multicast path to the member is not symmetric, then the TTL may not be appropriate. The member will inform the head if the Hellos are not being received. In this case the head will have to go through a correction phase until the member indicates that the Hellos are being received.

Retransmissions are multicast by the head (s) with a TTL scope that is just enough to reach its farthest RxGroup-member. The TTL, value is maintained and updated by the RxGroup-head every time a new member is accepted.

The TRAM at the receiver can be configured to continue or abort when late join or irrecoverable data loss is detected. If data loss is accepted, TRAM signals the event to the application.

FIG. 11 is a chart showing various messages and sub-messages used in TRAM. Multicast management, or MCAST_MANAGEMENT messages have Sub-Message types as follows: BEACON; HELLO; HA Head Advertisement; and, MS Member Solicitation.

Multicast data, or MCAST_DATA messages have the Sub-Message types: DATA as a TRAM data message; and, DATA_RETXM for data retransmission messages.

Unicast messages, or UCAST_MANAGMENT messages have the Sub-Message types: AM Accept Membership Message; RM Reject Membership message; HELLO_Uni a hello message with an ACK request; ACK an acknowledge message; CONGESTION, a rate based congestion message; and, HB the TRAM head bind message.

FIG. 12 is a table showing the timers used by TRAM. The T_BEACON timer is the inter beacon message interval timer, and in an exemplary embodiment of the invention is set to 1,000 milliseconds (ms). The T_BEACON_FILLER timer is the inter beacon filer interval timer, and in an exemplary embodiment of the invention is set to 30 seconds (sec). The T_ACK_INTERVAL is computed at run time based on the current rate of data transmission and the size of the configured acknowledgment window. The T_HELLO timer is the inter Hello interval timer, and in an exemplary embodiment of the invention is set to one (1) per ACK interval. The T_MS timer is the inter MS interval timer, and in an exemplary embodiment of the invention is set to 500 milliseconds (ms).

FIG. 13 is a table showing counters used by TRAM. N_ACK_MISSES is the number of ACK messages that can be missed before a head declares the member as non-responsive, and in an exemplary embodiment of the invention is set to a value of four (4). N_HELLO_MISSES is the number of HELLO messages that a member has missed for the member to declare the head as non-responsive, and in an exemplary embodiment of the invention is set to a value of five (5). N_HB_RETXM HB head bind message can be sent before the member tries another head, and in an exemplary embodiment of the invention is set to a value of three (3). N_MS_RETXM is the number of times a MS member solicitation message needs to be sent before a head increases its TTL.

FIG. 14 through FIG. 21 give the fields of the different messages used in TRAM. The figures conventionally show 32 bits (bits 0–31) horizontally as a word. Successive 32 bit words are shown vertically. Each word is divided into 8 bit bytes, although some fields occupy two 8 bit bytes, or sixteen bits; and some occupy all 32 bits of a word. All of the messages have the first word having the four byte fields: Ver # giving the version number of the software; MType giving the message type; Sub-Type giving the message sub-type; and FLAGS giving eight 1 bit flags, to be described hereinbelow. Also, all messages have the "Length of the message in bytes" in the first two bytes of the second word. The other fields of each message are selected for the particular message, as shown in FIG. 14–FIG. 23. The fields marked "Reserved" have not been assigned to a function.

FIG. 14 is a block diagram showing a multicast packet format for a sender Beacon Message.

FIG. 15 is a block diagram showing a multicast packet format for a Data Message.

FIG. 16 is a block diagram showing a multicast packet format for a HA Message.

FIG. 17 is a block diagram showing a multicast packet format for a MS Message.

FIG. 18 is a block diagram showing a multicast packet format for a Hello Message.

FIG. 19 is a block diagram of a unicast packet form at for a ACK Message.

FIG. 20 is a block diagram of a unicast packet format for a Hello Uni Message.

FIG. 21 is a block diagram of a unicast packet form at for a Head Bind Message.

FIG. 22 is a block diagram of a unicast packet format for a Accept Membership Message.

FIG. 23 is a block diagram of a unicast packet format for a Reject Membership Message.

FIG. 24 through FIG. 29 give the FLAG field for the indicated messages. The eight (8) bits of the flag field are shown as bit 7 through bit 0. Each bit is shown separately. Arrows lead to an explanation of the purpose of the bit. The bits which are not labeled have not been assigned a function, and so are reserved.

Figure 24:
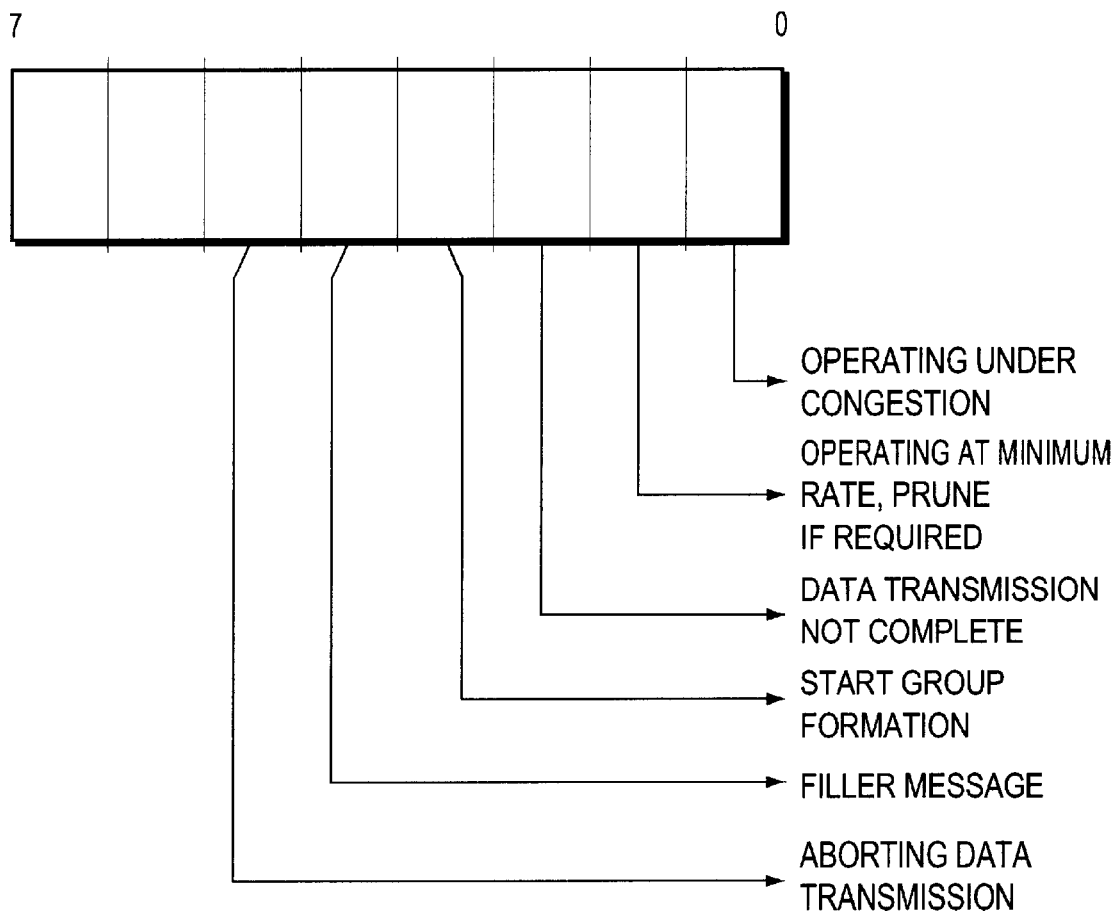
FIG. 24 is a block diagram of flag fields for a Sender Beacon Message.
Figure 25:
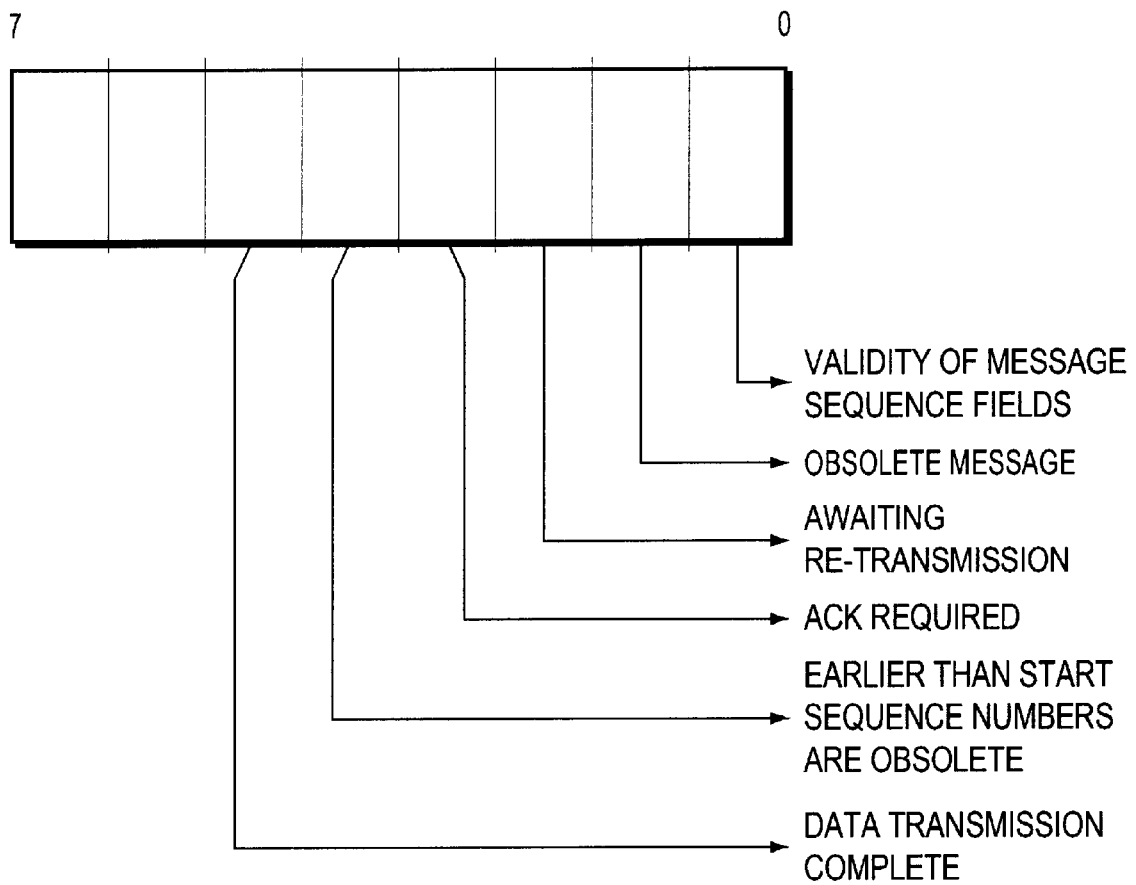
FIG. 25 is a block diagram of flag fields for a Hello Message.
Figure 26:
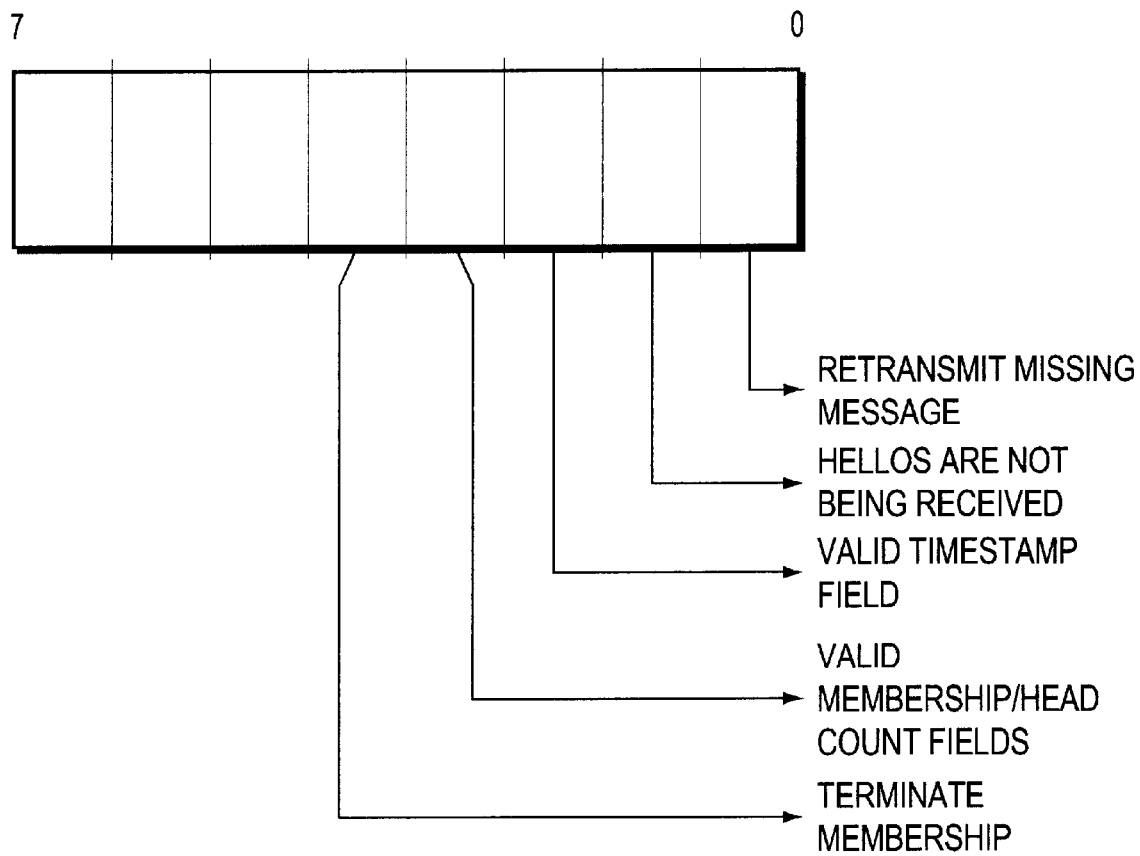
FIG. 26 is a block diagram of flag fields for a ACK Message.
Figure 27:
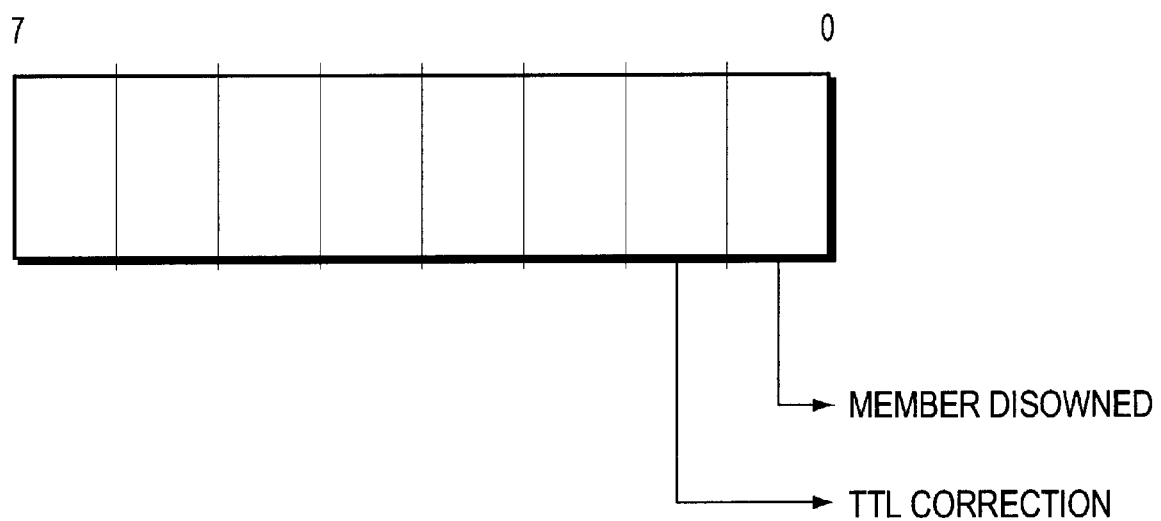
FIG. 27 is a block diagram of flag fields for a Hello-Uni Message.
Figure 28:
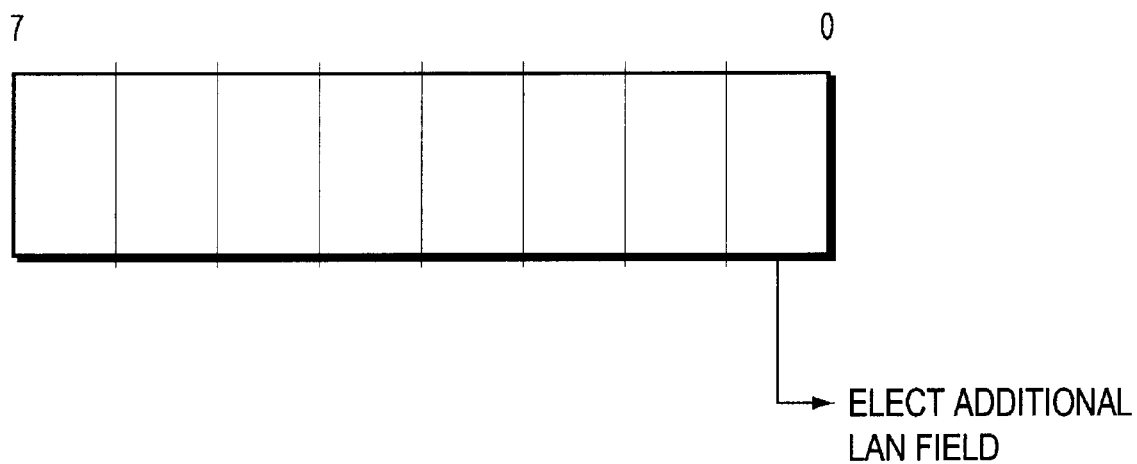
FIG. 28 is a block diagram of flag fields for a HA Message.
Figure 29:
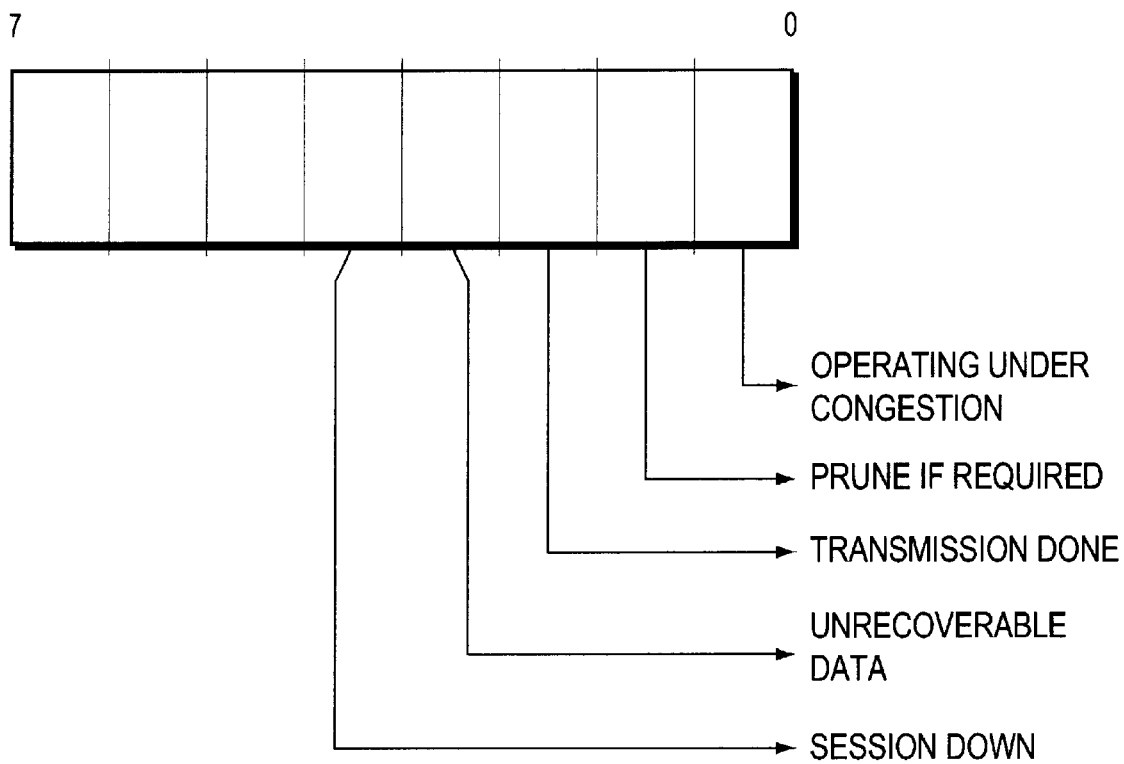
FIG. 29 is a block diagram of flag fields for a Data Message.

FIG. 24 is a block diagram of flag fields for a Sender Beacon Message. FIG. 25 is a block diagram of flag fields for a Hello Message. FIG. 26 is a block diagram of flag fields for a ACK Message. FIG. 27 is a block diagram of flag fields for a Hello Uni Message. FIG. 28 is a block diagram of flag fields for a HA Message. FIG. 29 is a block diagram of flag fields for a Data Message.

Security

Security issues as applicable to TRAM can be broadly classified into the following categories:

1. Denial of service.
2. Sender authentication.
3. Receiver authentication.

The denial of service category is concerned with issues related to how best a particular service can be denied/obstructed. The integrity of the data is not at stake in this case. TRAM can be severely affected by this. This can be easily accomplished by a rogue application that can flood the network with bogus multicast packets and thereby hamper the normal TRAM operation. TRAM can do nothing to prevent this and the least that can be done is to generate an event to the application when such a condition is predicted. Prediction of this condition is non-trivial, but one possible condition, in an exemplary embodiment of the invention, can be when the sender is performing a lot of retransmissions to all the members.

The sender authentication category is concerned with issues related to how the receiver TRAM can be assured that the multicast data message is actually originating from the sender and not from a rogue application. Possible ways to perform sender authentication are to:

(1) use IPsec technology; or
(2) use digital signature in the data messages generated by the sender.

The receiver authentication category is concerned with issues related to how the sender TRAM can be assured that only the authorized receivers are receiving the multicast data. Possible solutions take a round about approach as there is little that can be done to stop a rogue application from eavesdropping. The round about approach is to encrypt the data so that the rogue applications may not able to decode and use the data. This involves key management and distribution to decrypt the data and to overcome the problem of a rogue application succeeding in decrypting the key, the keys need to be changed frequently.

TRAM protocol itself does not support any of the mentioned possibilities, and the applications using the TRAM transport should incorporate a security layer above the TRAM transport.

Features

1. Late joins. In an exemplary embodiment of the invention, TRAM does not support full late joins and is limited to the extent of the availability of the required messages in the cache. In a further exemplary embodiment of the invention, support for full recovery can be provided and is expensive in terms of supporting a large cache for each multicast session.

2. In an exemplary embodiment of the invention, TRAM cannot scale when there are not enough receiving TRAMs that can support the required data cache or perform head duties.

3. In an exemplary embodiment of the invention, message retransmissions are based on the TTL scope of the group. This may cause some of the receivers in the TTL radius to receive the retransmissions without even requesting for one, and so the receivers must filter received messages.

4. In an exemplary embodiment of the invention, NACK messages are unicast to the heads and there is no NACK suppression to head. NACK messages can contribute significantly to congestion as NACK implosion, (depending on the membership count) under conditions where the same message is lost by all members.

In an exemplary embodiment of the invention, TRAM relies on the upper layers to provide security.

Further Features of an Exemplary Embodiment of the Invention Follow.

When a RxGroup-member requests retransmission of a message that is not found in its head's cache (message that has been aged out of the cache) the following happens in an exemplary embodiment of the invention. Typically this can occur when a new member is accepted. The RxGroup-head using the HELLO message informs the member of the unavailability of the message. The TRAM at the receiver informs the application of the loss of packet and moves on. The application upon processing the event can decide to continue or abort.

A minimum transmit speed is supported as follows. The minimum rate of data transmission is only used for various policies and TRAM provides no guarantees. For example, in an exemplary embodiment of the invention: TRAM drops all nodes that cannot keep up with the sender operating at its assigned minimum transmission rate. Also, the TRAM response to the sender's network being unable to support the data rate, in an exemplary embodiment of the invention, is to drop all receivers.

The application knows when all of the data has been received as follows. When the sender application makes a socket close call, a DATA_END Message is sent and the "close" call does not complete until the head responsibilities are complete. At the member side, upon detecting the DATA_END message, the application is returned EOF value when attempting read beyond the last data packet.

Repairs are handled as follows. A RxGroup-head including the sender, performs the repair by multicasting the required message with a local scope.

When the local head gets a request for a packet it hasn't received, the following occurs. The head sends a request for a retransmission from its head, and informs the member of the pending retransmission request. Sanity check on the validity of the message being requested has to be performed with the help of the sequence number before sending a retransmission request.

The Multicast and Unicast ports to be used are identified as follows. The unicast port details are included in the management messages. Hence the RxNodes and the Heads at the time of affiliating can inform the unicast port number in use.

The TTL scope computed is assumed to be symmetric, and the scope is monitored and repaired as follows. Mechanisms are in place to detect and correct TTL problems in situations where a head's retransmissions are no longer being received. This is done with the aid of Hello and ACK messages.

Pruning Strategies

The sender, after performing a slow start, settles to transmitting data within the minimum and maximum rates specified. When congestion is reported the sender starts operating at minimum rate specified by the application. As long as congestion is in effect, the sender sets a bit (Congestion bit) in the flag space of every beacon message or data message that it generates to inform receivers of the condition. The congestion bit only serves to inform the receiver community that the sender is responding to congestion.

If the minimum rate specified by the application is non zero and the sender is forced to generate packets under congestion. The sender in this case, sets another bit (Prune bit) in the flag space of the data message to indicate the heads to prune in order to keep up with the transmission rate.

The heads in response to the Prune bit setting can optionally start a monitoring and analysis process that can isolate the malfunctioning members. The heads will actually prune when their data cache usage exceeds the Threshold level (in an exemplary embodiment of the invention, no pruning takes place before the Threshold level).

In the absence of monitoring and analysis process, the head may adopt a simple strategy of pruning the member that has not acknowledged the maximum number of data packets. In the case of multiple receivers that have not acknowledged the same packets, all the members are pruned. In case of multiple members that have not acknowledged the same number of packets but the involved packets are different, then a member that has oldest unacknowledged message, is pruned.

If some form of monitoring and analysis is supported, then the head can monitor the retransmission rates of the members or validate if a member has gone off line, etc., to shortlist the malfunctioning members. If the cache level does reach Threshold, an analysis of the short listed members is performed to pick the receiver that needs to be pruned. The monitoring process is stopped when the sender indicates the evaporation of congestion.

Further, the sender application (when applicable), may choose to specify total size of the data that is being transferred and the duration within which the transfer has to take place (for example, a typical file transfer application). The sender TRAM can use these additional parameters to determine the average rate (Avg_rate) of data transmission that needs to be achieved to complete the data transmission with the specified duration. The sender starts the data transmission at Avg_rate and then attempts to increase the rate based on slow start mechanism. Whenever congestion is reported, the sender analyses the current data transmission status. If the data transmission thus far has been above the Avg_rate, then the data transfer byte count will be more than the Avg_rate byte count. Based on the surplus byte count achieved thus far, the sender can afford to suspend data transmission to enable the congestion to evaporate and allow retransmissions to take place. The sender can afford to suspend the transmission until the breakeven byte count point, or when the surplus byte count becomes less than or equal to zero (0). The surplus byte count is given by:

Surplus byte count=Current byte count−(Avg_rate*Elapsed transmission time).

where:

Elapsed transmission time=(Current time−Start time).

If the congestion evaporates before the breakeven byte count, the data transmission resumes. If the congestion persists beyond the breakeven byte count point, the sender resumes data transmission at the Avg_rate and the data packets will have Prune bit set in the flag space. The actions performed in response to the Prune bit are same as described earlier.

The advantage of this approach is that the sender can approximately cater to the maximum number of receivers that meet the reception criteria specified by the application.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed. It is to be understood that the above described embodiments are simply illustrative of the principles of the invention. Various other modifications and changes may be made by those skilled in the art which embody the principles of the invention and fall within the spirit and scope thereof.

What is claimed is:

1. A method of detecting congestion in a computer network, comprising:

determining by a predetermined receiver station a first number of messages missing in a first acknowledgment window;

determining by said predetermined receiver station a second number of messages missing during a second acknowledgment window;

measuring congestion on the network in response to an increase in missing messages as indicated by said first number and said second number.

2. The method of claim 1 further comprising:

transmitting to a repair head station which is affiliated with said member station the count of missing messages in said first acknowledgement window and said second acknowledgement window.

3. The method of claim 1 further comprising:

transmitting to a repair head station which is affiliated with said member station the difference in count of missing messages in said first acknowledgement window and said second acknowledgement window.

* * * * *